United States Patent
Polk, Jr. et al.

(10) Patent No.: US 8,192,664 B2
(45) Date of Patent: *Jun. 5, 2012

(54) THERMOPLASTIC MOLDING PROCESS AND APPARATUS

(75) Inventors: Dale E. Polk, Jr., Titusville, FL (US); Dale E. Polk, Sr., Titusville, FL (US)

(73) Assignee: LRM Industries International Inc., Rockledge, FL (US)

( * ) Notice: Subject to any disclaimer, the term of this patent is extended or adjusted under 35 U.S.C. 154(b) by 2153 days.

This patent is subject to a terminal disclaimer.

(21) Appl. No.: 11/140,727

(22) Filed: May 31, 2005

(65) Prior Publication Data

US 2006/0008967 A1  Jan. 12, 2006

(51) Int. Cl.
- B28B 3/26 (2006.01)
- B28B 3/20 (2006.01)
- B29C 47/00 (2006.01)

(52) U.S. Cl. ............. 264/210.1; 264/176.1; 264/211.12; 425/296; 425/297; 425/376.1

(58) Field of Classification Search ............... 264/165, 264/176.1, 177.17, 297.7, 211.14, 241, 211.21, 264/173.11, 1.29, 13, 210.1; 425/449, 296, 425/297, 376.1

See application file for complete search history.

(56) References Cited

U.S. PATENT DOCUMENTS

| | | | |
|---|---|---|---|
| 3,224,043 A | 3/1963 | Lameris et al. | |
| 3,302,243 A | 4/1964 | Ludwig | |
| 3,695,799 A | 10/1972 | Held, Jr. | 425/109 |
| 3,733,157 A * | 5/1973 | Hendry | 425/149 |
| 3,789,095 A | 1/1974 | Winstead | 264/51 |
| 3,820,928 A * | 6/1974 | Lemelson | 425/146 |
| 3,868,209 A | 2/1975 | Howell | 425/504 |
| 3,903,343 A | 9/1975 | Pfaff | 428/168 |
| 3,915,608 A | 10/1975 | Hujik | 425/119 |
| 4,051,290 A | 9/1977 | Jutte et al. | 428/168 |
| 4,304,622 A | 12/1981 | Krumm | 156/500 |
| 4,413,964 A | 11/1983 | Winstead | 425/66 |
| 4,420,300 A | 12/1983 | Winstead | 425/142 |
| 4,421,712 A | 12/1983 | Winstead | 264/551 |
| 5,551,860 A | 9/1996 | Budzynski et al. | 425/504 |

(Continued)

OTHER PUBLICATIONS

International Search Report for PCT/US03/35935 completed on Feb. 10, 1994, date Feb. 20, 2004.

*Primary Examiner* — Jason L. Lazorcik
(74) *Attorney, Agent, or Firm* — Michael A. Ervin; M.A. Ervin & Associates

(57) ABSTRACT

A system and method for forming an article from thermoplastic material and fiber. The method includes heating thermoplastic material to form a molten thermoplastic material for blending with the fiber. The molten thermoplastic material is blended with the fibers to form a molten composite material having a concentration of fiber by weight. The molten composite material may then be extruded through dynamic dies to deliver discrete controlled material that is gravitated onto a lower portion of a mold. The lower portion of the mold may be moved in space and time while receiving the flow of composite material to deposit a predetermined quantity of molten composite material thereon conforming to mold cavities of the lower and an upper portion of the mold. The upper portion of the mold may be pressed against the predetermined quantity of molten composite material and closing on the lower portion of the mold to form the article.

19 Claims, 14 Drawing Sheets

U.S. PATENT DOCUMENTS

| | | | | |
|---|---|---|---|---|
| 5,681,514 A | * | 10/1997 | Woody | 264/104 |
| 5,691,391 A | * | 11/1997 | Chen et al. | 521/99 |
| 5,800,757 A | | 9/1998 | Abrams et al. | 64/132 |
| 6,043,313 A | * | 3/2000 | Brink et al. | 524/589 |
| 6,068,715 A | | 5/2000 | Yokokita et al. | 156/62.2 |
| 6,869,558 B2 | * | 3/2005 | Polk et al. | 264/297.7 |

* cited by examiner

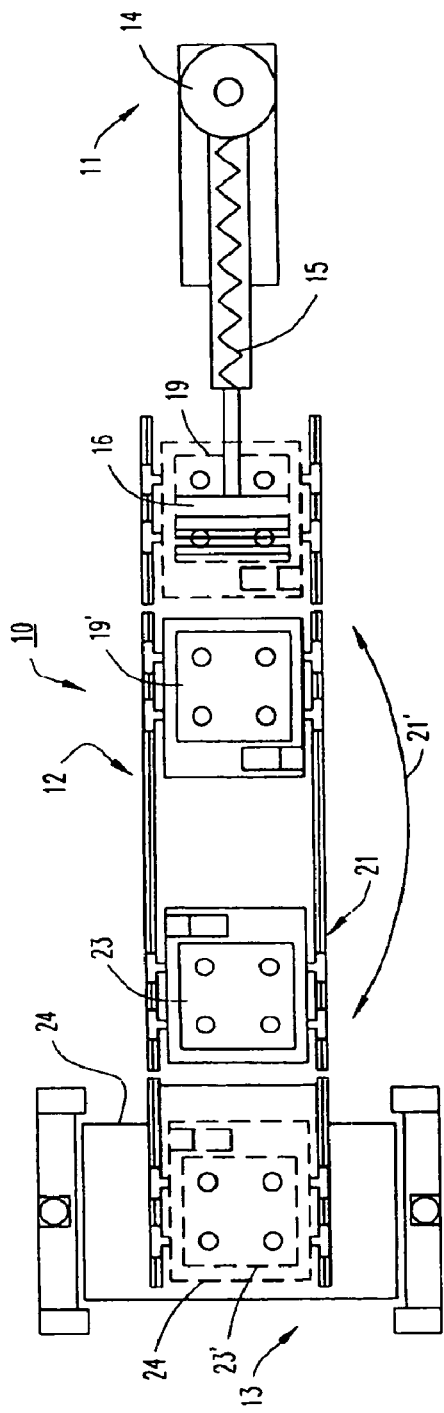
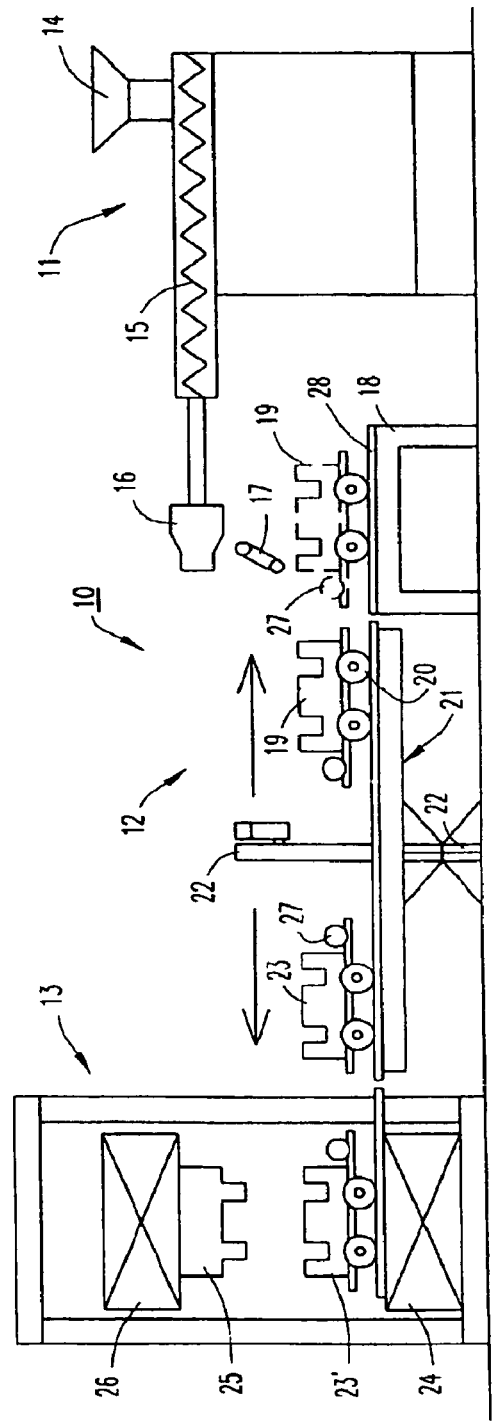
FIG. 1
FIG. 2

THERMOPLASTIC MOLDING PROCESS AND APPARATUS

CROSS-REFERENCES TO RELATED APPLICATIONS

The present application claims benefit of priority from U.S. patent application Ser. No. 10/885,329 filed Jul. 6, 2004, now U.S. Pat. No. 6,900,547, which is a Divisional of U.S. patent application Ser. No. 10/293,005 filed Nov. 13, 2002, which is a Continuation-In-Part of U.S. patent application Ser. No. 10/104,394 filed Mar. 25, 2002, now U.S. Pat. No. 6,719,551, which is a Divisional of U.S. patent application Ser. No. 08/993,516 filed Dec. 18, 1997, now abandoned.

BACKGROUND OF THE INVENTION

1. Field of the Invention

The present invention relates to a thermoplastic molding process and apparatus and especially to a thermoplastic process and apparatus using a proprietary dynamic gated die having adjustable gates for varying the thickness of the extruded material, which material is molded as it is passed from the extrusion die.

2. Description of the Related Art

In the past it has been common to provide a wide variety of molding systems including the molding of a thermoplastic resin or a thermoplastic composite part. In vacuum molding, a slab (constant thickness sheet) of heated thermoplastic material is placed on the vacuum mold and a vacuum drawn between the mold and the heated plastic material to draw the plastic material onto the mold. Similarly, in compression molding, a lump or slab of preheated material is pressed between two molding forms which compress the material into a desired part or shape.

3. Related Patents

Prior U.S. patents which use thermoforming of material can be seen in the four Winstead patents, U.S. Pat. Nos. 4,420,300; 4,421,712; 4,413,964; and 3,789,095. The Winstead '712 and '300 patents are for an apparatus for continuous thermoforming of sheet material including an extruder along with stretching means and a wheel having a female mode thereon and a plurality of plug-assist means interlinked so as to form an orbiting device having a plug-assist member engaging the sheet material about a substantial arc of wheel surface. The Winstead '964 patent teaches an apparatus for continuously extruding and forming molded products from a web of thermoplastic material while continuously separating the product from the web, stacking and handling the products, and recycling the web selvage for further extrusion. The apparatus uses multiple mode cavities in a rotating polygon configuration over a peripheral surface of which the biaxially oriented web is continuously positioned by a follower roller interfacing the polygon with a biaxial orientation device. The Winstead patent U.S. Pat. No. 3,789,095 is an integrated method of continuously extruding low density form thermoplastic material and manufacturing three-dimensional formed articles therefrom.

The Howell U.S. patent, U.S. Pat. No. 3,868,209, is a twin sheet thermoformer for fabricating a hollow plastic object from a pair of heat-fusible thermoplastic sheets which are serially moved in a common horizontal plane from a heating station to a mold mechanism at a forming station. The Held, Jr. patent, U.S. Pat. No. 3,695,799, is an apparatus for vacuum forming hollow articles from two sheets of thermoplastic material by passing the sheets of material through a heating zone while in a spaced relationship and between two mold halves. The mold halves are brought together as a vacuum is pulled on each sheet to cause it to conform to the shape of its respective mold so as to mold a hollow article. The Budzynski et al., U.S. Pat. No. 5,551,860, is a blow molding apparatus for making bottles which have rotating molds continuously rotating while aligning one mold at a time with an extrusion die handle for loading the mold. The Hujik patent, U.S. Pat. No. 3,915,608, is an injection molding machine for multi-layered shore soles which includes a turntable for rotating a plurality of molds through a plurality of work stations for continuously molding shoe soles. The Ludwig patent, U.S. Pat. No. 3,302,243, is another apparatus for injection molding of plastic shoes. The Lameris et al. patent, U.S. Pat. No. 3,224,043, teaches an injection molding machine having at least two molds which can be rotated for alignment with plastic injecting nozzles. The Vismara patent, U.S. Pat. No. 4,698,001, is a machine for manufacturing molded plastic motorcycle helmets and which uses a compression type mold in which a pair of mold halves is shifted between positions. The Krumm patent, U.S. Pat. No. 4,304,622, is an apparatus for producing thick slabs of thermoplastic synthetic resins which includes a pair of extruders, each extruding a half slab strand to a respective roller assembly. The roller assemblies have final rollers which form a consolidation nip between them in which the two half slabs are bonded together.

Composites and Other Processes

Composites are materials formed from a mixture of two or more components that produce a material with properties or characteristics that are superior to those of the individual materials. Most composites comprise two parts, namely a matrix component and reinforcement component(s). Matrix components are the materials that bind the composite together and they are usually less stiff than the reinforcement components. These materials are shaped under pressure at elevated temperatures. The matrix encapsulates the reinforcements in place and distributes the load among the reinforcements. Since reinforcements are usually stiffer than the matrix material, they are the primary load-carrying component within the composite. Reinforcements may come in many different forms ranging from fibers, to fabrics, to particles or rods imbedded into the matrix that form the composite.

Composite structures have existed for millions of years in nature. Examination of the microstructure of wood or the bioceramics of a seashell reveals the occurrence of composites found in nature and indicates that modern composite materials have essentially evolved to mimic structures found in nature. A perfect example of a composite material is concrete. Different forms of concrete offer an insight as to how reinforcements work. The cement acts as the matrix, which holds the elements together, while the sand, gravel, and steel, act as reinforcements. Concrete made with only sand and cement is not nearly as strong as concrete made from cement, sand, and stones, which, in turn, is not as strong as concrete reinforced with steel, sand and stones. The matrix and reinforcement materials of concrete are blended, poured and molded, typically in a form structure. In the generation of parts made with other composite materials, the shape of a composite structure or part is determined by the shape or geometry of the mold, die or other tooling used to form the composite structures.

There are many different types of composites, including plastic composites. Each plastic resin has its own unique properties, which when combined with different reinforcements create composites with different mechanical and physical properties. If one considered the number of plastic polymers in existence today and multiplied that figure by the number of reinforcements available, the number of potential composite materials is staggering. Plastic composites are classified within two primary categories: thermoset and thermoplastic composites.

In the case of thermoset composites, after application of heat and pressure, thermoset resins undergo a chemical change, which cross-links the molecular structure of the material. Once cured, a thermoset part cannot be remolded. Thermoset plastics resist higher temperatures and provide greater dimensional stability than most thermoplastics because of the tightly cross-linked structure found in thermoset plastic. Thermoplastic matrix components are not as constrained as thermoset materials and can be recycled and reshaped to create a new part. Common matrix components for thermoplastic composites include polypropylene (PP), polyethylene (PE), polyetheretherketone (PEEK) and nylon. Thermoplastics that are reinforced with high-strength, high-modulus fibers to form thermoplastic composites provide dramatic increases in strength and stiffness, as well as toughness and dimensional stability.

Composite materials are used in numerous applications across a broad range of industries. Typically, composites are used to replace products made of metal alloys or multi-component metal structures assembled with fasteners or other connectors. Composites offer sufficient strength, while providing a reduction in weight. This is particularly important in industries such as automotive and aerospace, where the use of composite materials results in lighter, faster, more fuel-efficient and environmentally robust aircraft and automobiles. Composites may also be designed to replace wood, fiberglass and other more traditional materials. The following is a partial list of industries that may have application for the use of large parts made from thermoplastic composite materials: aerospace, automotive, construction, home appliance, marine, material handling, medical, military, telecommunications, transportation and waste management.

In general, among other attributes, thermoplastic composite materials are resistant to corrosion and offer long fatigue lives making them particularly attractive for many manufacturers. The fatigue life refers to the period of time that a part lasts prior to exhibiting material wear or significant stress, to the point of impairing the ability of the part to perform to specification. Typically, composites are utilized in applications where there is a desire to reduce the weight of a particular part while providing the strength and other desirable properties of the existing part. There are a number of parts made from thermoset composite materials that are quite expensive. These types of parts are typically referred to as advanced composite materials and are utilized most often in the military and aerospace industries.

Product development engineers and production engineers believe that thermoplastic composite materials will play an ever-increasing role in modern technological development. New thermoplastic resins are regularly developed and more innovative methods of manufacturing are being introduced to lower the costs associated with manufacturing parts made from composite materials. As the cost for manufacturing parts made with thermoplastic composite materials reduces, the use of thermoplastic composites becomes a more viable solution for many commercial and industrial applications.

Molding Methods Currently Available for Thermoplastic Composites

Most of the commercially available manufacturing technology for thermoplastic composites was adapted from methods for processing thermoset composites. Since these methods are designed for resin systems with much lower viscosities and longer cure times, certain inefficiencies and difficulties have plagued the thermoplastic manufacturing process. There are several methods of manufacturing with thermoplastic composites currently in use. Some of the most common processes include compression molding, injection molding, and autoclave processing, all of which can be used for the production of "near-net shape" parts, i.e., parts that substantially conform to the desired or designed shape after molding. Less common methods for process thermoplastic composites include pultrusion, vacuum forming, diaphragm forming and hot press techniques.

Compression Molding

Compression molding is by far the most widespread method currently used for commercially manufacturing structural thermoplastic composite components. Typically, compression molding utilizes a glass mat thermoplastic (GMT) composite comprising polypropylene or a similar matrix that is blended with continuous or chopped, randomly oriented glass fibers. GMT is produced by third-party material compounders, and sold as standard or custom size flat blanks to be molded. Using this pre-impregnated composite (or pre-preg as it is more commonly called when using its thermoset equivalent), pieces of GMT are heated in an oven, and then laid on a molding tool. The two matched halves of the molding tool are closed under great pressure, forcing the resin and fibers to fill the entire mold cavity. Once the part is cooled, it is removed from the mold with the assistance of an ejecting mechanism.

Generally, the matched molding tools used for GMT forming are machined from high strength steel to endure the continuous application of the high molding pressure without degradation. These molds are often actively heated and cooled to accelerate cycle times and improve the surface finish quality. GMT molding is considered one of the most productive composite manufacturing processes with cycle times ranging between 30 and 90 seconds. Compression molding does require a high capital investment, however, to purchase high capacity presses (2000-3000 tons of pressure) and high pressure molds, therefore it is only efficient for large production volumes. Lower volumes of smaller parts can be manufactured using aluminum molds on existing presses to save some cost. Other disadvantages of the process are low fiber fractions (20% to 30%) due to viscosity problems, and the ability to only obtain intermediate quality surface finishes.

Injection Molding

Injection molding is the most prevalent method of manufacturing for non-reinforced thermoplastic parts, and is becoming more commonly used for short-fiber reinforced thermoplastic composites. Using this method, thermoplastic pellets are impregnated with short fibers and extruded into a closed two-part hardened steel tool at injection pressures usually ranging from 15,000 to 30,000 psi. Molds are heated to achieve high flow and then cooled instantly to minimize distortion. Using fluid dynamic analysis, molds can be designed which yield fibers with specific orientations in various locations, but generically injection molded parts are isotropic. The fibers in the final parts typically are no more than one-eighth (⅛)" long, and the maximum fiber volume content is about 40%. A slight variation of this method is known as resin transfer molding (RTM). RTM manufacturing utilizes matted fibers that are placed in a mold which is then charged with resin under high pressure. This method has the advantages of being able to manually orient fibers and use longer fiber lengths.

Injection molding is the fastest of the thermoplastic processes, and thus is generally used for large volume applications such as automotive and consumer goods. The cycle times range between 20 and 60 seconds. Injection molding also produces highly repeatable near-net shaped parts. The ability to mold around inserts, holes and core material is another advantage. Finally, injection molding and RTM generally offer the best surface finish of any process.

The process discussed above suffers from real limitations with respect to the size and weight of parts that can be produced by injection molding, because of the size of the required molds and capacity of injection molding machines. Therefore, this method has been reserved for small to medium size production parts. Most problematic from a structural reinforcing point is the limitation regarding the length of reinforcement fiber that can be used in the injection molding process.

Autoclave Processing

Autoclave processing is yet another thermoplastic composite manufacturing process used by the industry. Thermoplastic prepregs with unidirectional fibers or woven fabrics are laid over a single sided tool. Several layers of bagging material are placed over the prepreg assembly for surface finish, to prevent sticking, and to enable a vacuum to be drawn once it is placed in an autoclave. Inside the autoclave, the composite material is heated up and put under pressure to consolidate and cross-link the layers of material. Unlike compression and injection molding, the tool is an open mold and can be made of either aluminum or steel since the pressures involved are much lower.

Because the autoclave process is much slower and more labor intensive, it is utilized primarily for very large, low volume parts that require a high degree of accuracy; it is not conducive for production lines. Significant advantages of this method include high fiber volume fractions and control of the fiber orientation for enabling specific material properties. This process is particularly useful for prototyping because the tooling is relatively inexpensive.

Molding Methods for Thermoplastic Composites Requiring "Long" Fibers

None of the processes described above are capable of producing a thermoplastic composite reinforced with long fibers (i.e., greater than about one-half inch) that remain largely unbroken during the molding process itself, this is especially true for the production of large and more complex parts. Historically, a three-step process was utilized to mold such a part: (1) third party compounding of pre-preg composite formulation; (2) preheating of pre-preg material in oven; and, (3) insertion of molten material in a mold to form a desired part. This process has several disadvantages that limit the industry's versatility for producing more complex, large parts with sufficient structural reinforcement.

One disadvantage is that the sheet-molding process cannot produce a part of varying thickness, or parts requiring "deep draw" of thermoplastic composite material. The thicker the extruded sheet, the more difficult it is to re-melt the sheet uniformly through its thickness to avoid problems associated with the structural formation of the final part. For example, a pallet having feet extruding perpendicularly from the top surface is a deep draw portion of the pallet that cannot be molded using a thicker extruded sheet because the formation of the pallet feet requires a deep draw of material in the "vertical plane" and, as such, will not be uniform over the horizontal plane of the extruded sheet. Other disadvantages associated with the geometric restrictions of an extruded sheet having a uniform thickness are apparent and will be described in more detail below in conjunction with the description of the present invention.

The present invention is directed towards a molding system for producing a thermoplastic resin of thermoplastic composite parts using either a vacuum or compression mold with parts being fed directly to the molds from an extrusion die while the thermoplastic slab still retains the heat used in heating the resins to a fluid state for forming the sheets of material through the extrusion die. The present invention relates to a thermoplastic molding process and apparatus and especially to a thermoplastic process and apparatus using a thermoplastic extrusion die having adjustable gates for varying the thickness of the extruded material, which material is molded as it is passed from the extrusion die.

The present invention is further directed towards a continual thermoforming system which is fed slabs of thermoplastic material directly from an extruder forming the slabs of material onto a mold which can be rotated between stations. The thermoplastic material is extruded through an extrusion die which is adjustable for providing deviations from a constant thickness plastic slab to a variable thickness across the surface of the plastic slab. The variable thickness can be adjusted for any particular molding run or can be continuously varied as desired. This allows for continuous molding or thermoplastic material having different thickness across the extruded slab and through the molded part to control the interim part thickness of the molded part so that the molded part can have thick or thin spots as desired throughout the molded part. The present invention is not limited as to size, shape, composition, weight or strength of a desired part manufactured by the extrusion molding process.

SUMMARY OF THE INVENTION

A thermoplastic molding system includes a thermoplastic extrusion die for the extrusion of a thermoplastic slab profiled by adjustable die gate members, i.e., dynamic die settings, for varying the thickness of the extruded material in different parts of the extruded slab. The thermoplastic extrusion die has a trimmer for cutting the extruded thermoplastic slab from the thermoplastic extrusion die. A plurality of thermoplastic molds, which may be either vacuum or compression molds, are each mounted on a movable platform, such as a rotating platform, for moving one mold at a time into a position to receive a thermoplastic slab being trimmed from the thermoplastic extrusion die. A molded part is formed with a variable thickness from a heated slab of thermoplastic material being fed still heated from the extrusion die. A plurality of molds are mounted to a platform to feed one mold into a loading position for receiving a thermoplastic slab from the extrusion die and a second mold into a release position for removing the formed part from the mold. The platform may be a shuttle or a rotating platform and allows each molded part to be cooled while another molded part is receiving a thermoplastic slab. A thermoplastic molding process is provided having the steps of selecting a thermoplastic extrusion die setting in accordance with the apparatus adjusting the thermoplastic extrusion die for varying the thickness of the extruded material passing therethrough in different parts of the extruded slab. The thermoplastic material is heated to a fluid state and extruded through the selected thermoplastic die which has been adjusted for varying the thickness of the extruded material in different parts of the extruded slab, trimming the extruded thermoplastic slab having a variable thickness to a predetermined size, and directing each trim slab of heated thermoplastic material onto a thermoforming mold, and molding a predetermined part in the mold so that the molded part is formed with a variable thickness from a slab of material heated during extrusion of the material.

"This extrusion-molding" process also facilitates the formation of thermoplastic composite structures reinforced with long fibers (greater than about one-half inch) because the extruder dispenses the molten, thermoplastic composite material through the dynamic die, gravitating the material directly onto a lower mold that is movable with respect to the position of the dynamic die. As used herein, the term "lower mold" refers to the lower half of a matched-mold into which thermoplastic material is directed. Similarly, the term "upper mold" refers to the upper half of the matched-mold within which the desired thermoplastic part is formed, when the upper and lower mold halves are combined i.e., closed. The lower mold may be moved via a trolley to fill the cavity of the mold with varying quantities of the thermoplastic composite material. For example, if the cavity defined by the lower and an upper mold is larger over a certain horizontal range, the lower mold may be slowed down to receive more molten thermoplastic composite material in that region. The dynamic die employs flow control elements that vary or regulate the flow of the molten extruded thermoplastic composite material to deliver different quantities of material from each of the flow control element, to deposit the material selectively across the width of the lower mold in a direction perpendicular to the direction it is moving. The thermoplastic composite material may be molded with long fibers (greater than about one-half inch) having a concentration of at least ten percent (10%) by weight to as much as fifty to sixty percent (50-60%) by weight, with low fiber-fracture rates. After the molten extruded thermoplastic composite material gravitates onto the lower mold, the trolley is automatically transported into a press that closes the upper mold onto the lower mold to form the composite part.

One embodiment according to the principles of the present invention includes a system and method for forming an article from thermoplastic material and fiber. The method includes heating thermoplastic material to form a molten thermoplastic material while blending with the fiber. The molten thermoplastic material is blended with the fibers to form a molten composite material having a desired concentration of fiber by weight and/or volume. The molten composite material may then be extruded through the dynamic die to form a prescribed flow of composite material and gravitated onto a lower portion of a mold for forming the article. The lower mold may be discretely moved in space and time at varying speeds while receiving the flow of composite material to deposit a predetermined quantity of molten composite material thereon conforming exactly to the amount of material required in the mold cavity of the lower mold. The upper portion of the mold may be pressed against the predetermined quantity of molten composite material and closing on the lower portion of the mold to form the article.

BRIEF DESCRIPTION OF THE DRAWINGS

Other objects, features, and advantages of the present invention will be apparent from the written description and the drawings in which:

FIG. 1 is a top plan view of a molding system in accordance with the present invention;

FIG. 2 is a side elevation view of the molding apparatus of FIG. 1;

DETAILED DESCRIPTION OF THE INVENTION

Figure 3A:
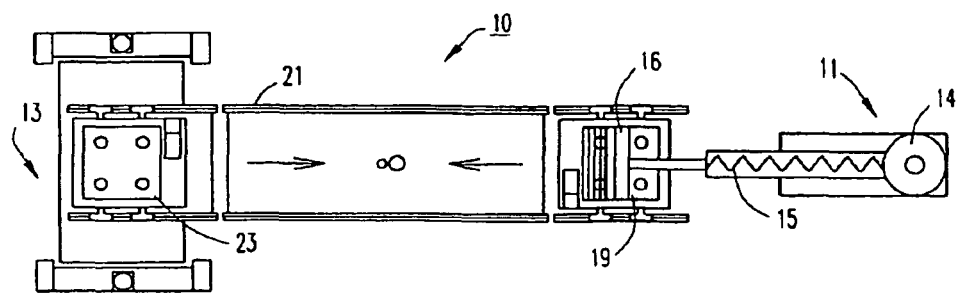
FIGS. 3A-3E are plan views of the mold of FIGS. 1 and 2 in different steps of the process of the present invention.

For many years, a gap has existed in the composites manufacturing industry that failed to provide a process to mass produce large thermoplastic composite structures or parts at the rates and labor efficiencies of compression or injection molding, with the accuracy and low pressures of autoclave molding. The principles of the present invention provide for processes that closes this gap and produces such thermoplastic composite parts. The processes are suitable for mid to high production volumes of parts, and may produce large parts and structures with high reinforcing fiber concentration and at low molding pressures.

Referring to FIGS. 1 and 2 of the drawings, a thermoforming apparatus 10 for thermoforming parts from a thermoplastic resin or from a thermoplastic composite is illustrated having an extruder 11, a mold exchange station 12, and a compression mold station 13. The extruder has a hopper 14 mounted on top for feeding a thermoplastic resin or composite material into an auger 15 where heaters are heating the thermoplastic material to a fluid material while the auger is feeding it along the length of the extruder path to an extrusion die 16 at the end thereof. The material being fed through the extruder and out the extrusion die is cut with a trimmer 17 mounted at the end of the die 16. The material is extruded in a generally flat plate slab (not shown) and is trimmed at predetermined points by the trimmer 17 as it leaves the extrusion die 16. A support platform 18 will support a traveling mold half 19 directly under the extrusion die 16 for receiving a slab of thermoplastic material. The traveling mold half 19 has wheels 20 which allow the mold half 19 to be moved from the platform 18 onto a rotating platform 21 (shown as mold half 19') which is mounted on a central rotating shaft 22 for rotation as indicated by the bidirectional arrow 21' in FIG. 1. The rotating platform 21 will have a second mold half 23 thereon which can be fed into the compression molding station 13 (shown as mold half 23') while the mold half 19 is on the platform 18. The mold half 23' can be supported on a stationary platform 24 in the compression station directly beneath a common posing fixed mold half 25 mounted to a moving platen 26 where the molding operation takes place. Thus, the mold halves 19 and 23 can shuttle back and forth so that one mold can be capturing a thermoplastic slab while the other mold half is molding a part. Each of the traveling mold halves 19, 23 has an electric motor 27 for driving the mold half from the rotating platform 21 onto the platform 18 or onto the stationary platform 24. A linear transducer 28 can be mounted on the platform 18 for controlling the traveling mold halves speed.

It should be noted at this point that the extruder 11 produces the heated extruded slab still containing the heat energy onto the traveling mold half where it is delivered to the compression mold 13 and molded into a part without having to reheat a sheet of thermoplastic material. As will also be noted hereinafter in connection with FIGS. 4 and 5, the thermoplastic slab can also be of variable thickness throughout its width to enhance the thermoformed part made from the mold.

Figure 3B:
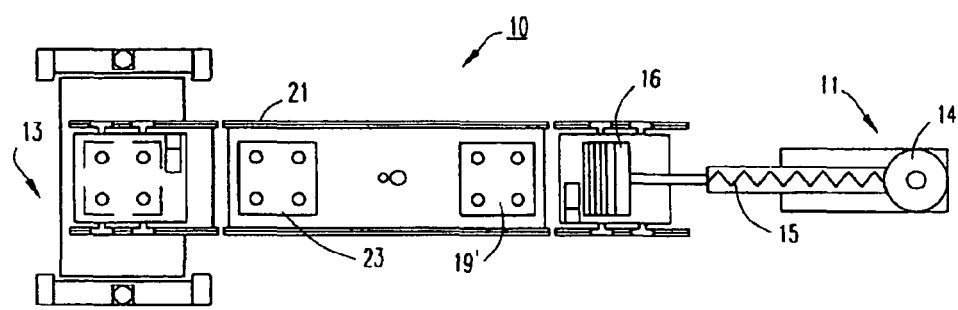
Figure 3C:
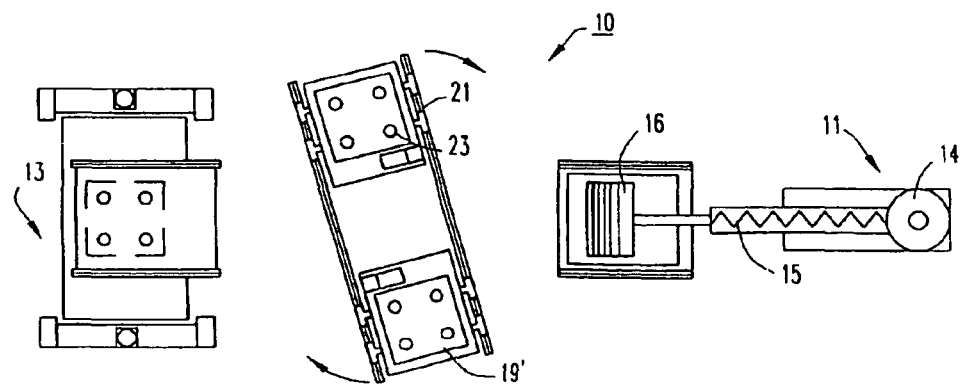
Figure 3D:
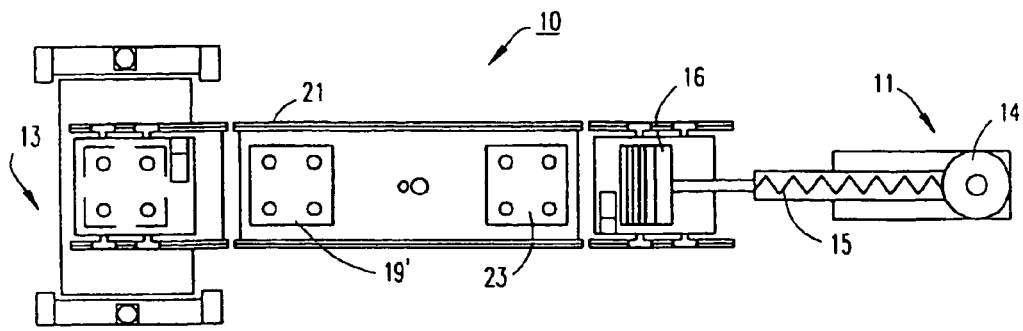
Figure 3E:
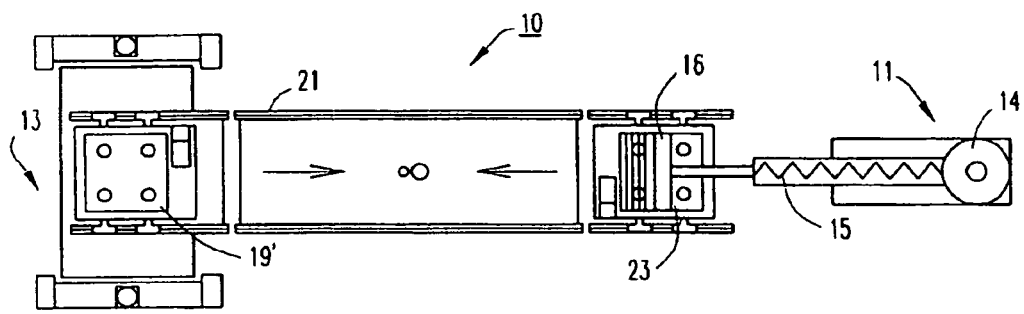

Turning to FIGS. 3A-3E, the thermoplastic molding apparatus 10 is illustrated having the mold halves 19, 19' and 23, 23' in a series of positions in the operation of the press in accordance with the present invention. Each figure has the extruder 11 having the hopper 14 feeding the thermoplastic resin or composite material into an auger 16 where it is heated before being extruded. In FIG. 3A, mold half 23' is empty and mold half 19 is being charged with a hot melt directly from the extruder 11. In FIG. 3B, the mold carrier moves the mold halves 19 and 23' on the rotating turntable 21. In FIG. 3C, the rotating turntable 21 rotates on the central axis shaft 22 (not shown) between stations for loading a slab onto one mold half 23 and a loaded mold half 19' into the compression or vacuum molding machine 13. In FIG. 3D, the mold half 19' travels into the press 13 while the empty mold half 23 travels under the extrusion die 16 for loading with a slab of thermoplastic material. In FIG. 3E, the mold half 19' is press cooled and the part is ejected while mold half 23 is charged with a hot melt as it is moved by its carrier below the extrusion die 16 until completely charged.

Figure 4:
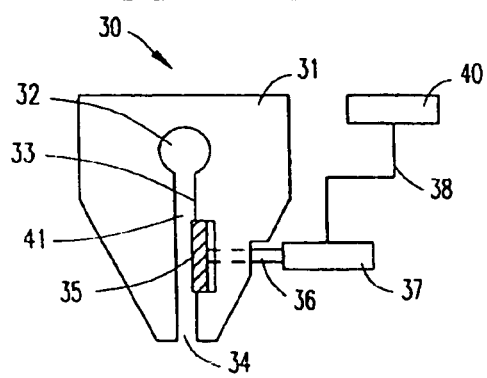
FIG. 4 is a side elevation of the extruder of FIGS. 1 and 2.
Figure 5:
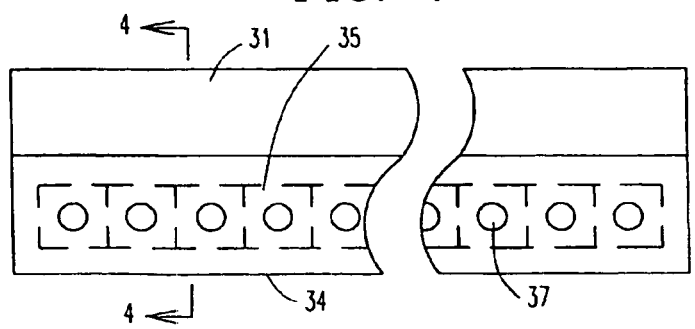
FIG. 5 is a rear elevation of the extruder of FIG. 4.

Turning to FIGS. 4 and 5, the extrusion die 30 is illustrated having the die body 31 having the channel 32 for the feeding of a fluid thermoplastic material with the auger 15 of FIGS. 1 and 2 therethrough out the extrusion channel 33 to produce a sheet or slab of thermoplastic extruded material from the mouth 34. The die 30 has a plurality of gated plates 35 each connected to a threaded shaft 36 driven by a gate actuator motor 37 which can be a hydraulic or pneumatic motor but, as illustrated, is an electrical stepper motor having a control line 38 feeding to a remote controller 40 which can step the motor 37 in steps to move the plate 35 in and out to vary the thickness of the thermoplastic slab passing the channel portion 41. A plurality of any number of motors 37 can be seen in FIG. 5 driving a plurality of plates, each mounted abutting the next plate, and each plate controlled separately to thereby vary the plates 35 in the channel 41 in a wide variety of patters for producing a slab out the output portion 34 having thickness which can vary across the width of the extruded slab. It will also be clear that the gates 35 can be manually controlled by individually threading each gate into and out to adjust the thickness of any portion of the extrusion die and can, alternatively, be controlled by a controller 40 which can be a computer program to vary the thickness of any portion of the extruded slab under remote control as desired.

A thermoplastic molding process is provided which includes selecting a thermoplastic extrusion die 16 or 30 for the extrusion of a thermoplastic slab, which extrusion die has an adjustable die gate members for varying the thickness of the extruded material in different parts of the extruded slab. The process includes adjusting the thermoplastic extrusion die for various thickness of the extruded material passing therethrough in different parts of the extruded slab and then heating a thermoplastic material to a fluid and extruding a slab of fluid thermoplastic material through the selected and adjusted thermoplastic extrusion die. The thermoplastic slab is then trimmed and directed onto a heated thermoplastic material into a thermoforming mold 19 or 23 and molded in a molding apparatus 13 to form a part with a variable thickness in the part.

It should be clear at this time that a thermoplastic molding process and apparatus have been provided which allow for the thermoforming of a part with a variable thickness with an extrusion die which can be continuously controlled to vary the thickness of different parts of the extruded slab being molded and that the molding is accomplished while the thermoplastic slab is still heated to utilize the heat energy from the extrusion process. However, it should also be clear that the present invention is not to be considered limited to the forms shown which are to be considered illustrative rather than restrictive. For example, although the extruded material is described sometimes as a generally flat plate slab, it is also described as follows: (i) containing heat energy when delivered to the compression mold 13 to obviate reheating, (ii) having a variable thickness throughout its width, (iii) being a hot melt when charged into the mold half 19 from the extruder 11, (iv) using a plurality of gated plates 35 to vary the thickness across the width of the extruded material and in different parts of the extruded material, and finally (v) extruding molten thermoplastic material through the selected and adjusted extrusion die to achieve a variable thickness in the part formed. Thus, the extruder generally provides a molten flow of thermoplastic composite material through the dynamic die, gravitating onto a mold half or lower mold in variable quantities in the vertical plane and across both horizontal directions on the mold.

The "extrusion-molding" process described above is ideal for manufacturing medium to large thermoplastic composite structures reinforced with glass, carbon, metal or organic fibers to name a few. The extrusion-molding process includes a computer-controlled extrusion system that integrates and automates material blending or compounding of the matrix and reinforcement components to dispense a profiled quantity of molten composite material that gravitates into the lower half of a matched-mold, the movement of which is controlled while receiving the material, and a compression molding station for receiving the lower half of the mold for pressing the upper half of the mold against the lower half to form the desired structure or part. The lower half of the matched-mold discretely moves in space and time at varying speeds to enable the deposit of material more thickly at slow speed and more thinly at faster speeds. The thermoplastic apparatus 10 described above is one embodiment for practicing the extrusion-molding process. Unprocessed resin (which may be any form of regrind or pelletted thermoplastic or, optionally, a thermoset epoxy) is the matrix component fed into a feeder or hopper of the extruder, along with reinforcement fibers greater than about one-half inch (½") in length. The composite material may be blended and/or compounded by the extruder 11, and "intelligently" deposited onto the lower mold half 19 by controlling the output of the extruder 11 with the gates 35 and the movement of the lower mold half 19 relative to the position of the extruder 11, as will be described below with the embodiments shown in FIGS. 6A and 6B. In those embodiments the lower section of the matched-mold is fastened on a trolley which moves discretly below the dynamic die. The lower section of the matched-mold receives precise amounts of extruded composite material, and is then moved into the compression molding station.

The thermoplastic matrix materials that may be utilized in the extrusion-molding processes to form the composite material include thermoplastic resins as understood in the art. The thermoplastic resins that may be utilized in accordance with the principles of the present invention may include any thermoplastic resin that can be melted and blended by the extruder 11. Examples of such thermoplastic resins are provided in TABLE 1 with the understanding that the examples are not intended to be a complete list, and that other thermoplastic resins and materials may be utilized in producing the structural parts utilizing the extrusion-molding system. Additionally the thermoplastic resins of TABLE 1 may be used alone or in any combinations thereof.

TABLE 1

| Thermoplastic Resins | |
|---|---|
| polyethylene | polysulfone |
| polypropylene | polyphenylene oxide |
| polyvinyl chloride | polybutylene terephthalate |
| polyvinylidene chloride | polyethylene terephthlate |
| polystyrene | polycyclohexane diethylene terephthalate |
| styrene-butadiene-acrylonitrile copolymer | polybutylene naphthalate |
| nylon 11 | other polyesters used as soft segments |
| nylon 12 | thermotropic liquid crystal polymers |
| nylon 6 | polyphenylene sulfide |
| nylon 66 | polyether ether ketones |
| other aliphatic nylons | polyether sulfones |
| copolymers of aliphatic nylons further copolymerized with terephthalic acid or other aromatic dicarboxylic acids or aromatic diamines | polyether imides |
| other aromatic polyamides | polyamide imides |
| various copolymerized polyamides | polyimides |
| polycarbonate | polyurethane |
| polyacetal | polyether amides |
| polymethylmethacrylate | polyester amides |

Particular thermoplastic materials, including polypropylene, polyethylene, polyetheretherketone, polyesters, polystyrene, polycarbonate, polyvinylchloride, nylon, polymethyl, polymethacrylate, acrylic, polyurethane and mixtures thereof, have been especially suitable for the extrusion-molding process.

The fibers that serve as the reinforcement component for the thermoplastic composite materials generally include those materials that may be utilized to reinforce thermoplastic resins. Fiber materials suitable for use in accordance with the principles of the present invention include, without limitation, glass, carbon, metal and natural materials (e.g., flax, cotton), either alone or in combination. Other fibers not listed may also be utilized as understood in the art. Although the diameter of the fiber generally is not limited, the fiber diameter for molding larger structural parts generally ranges between 1 and 20 μm. It should be understood, however, that the diameter of the fibers may be larger depending on a number of factors, including strength of structural part desired, density of fiber desired, size of structural part, etc. In particular, the effect of improvement of mechanical properties is marked with a fiber having a diameter of approximately one (1) to approximately nine (9) μm.

The number of filaments bundled in the fiber also is not generally limited. However, a fiber bundle of 10,000 to 20,000 filaments or monofilaments is generally desired for handling considerations. Rovings of these reinforcing fibers may be used after surface treatment by a silane or other coupling agent. To improve the interfacial bonding with the thermoplastic resin, for example, in the case of a polyester resin, surface treatment may be performed by a thermoplastic film forming polymer, coupling agent, fiber lubricant, etc. Such surface treatment may be performed in advance of the use of the treated reinforcing fibers or the surface treatment may be performed just before the reinforcing fibers are fed into the extruder in order to run the extrusion process to produce the molten thermoplastic composite without interruption. The ratio between the thermoplastic resin and fiber is not particularly limited as it is possible to produce the thermoplastic composite and shaped articles using any ratio of composition in accordance with the final object of use. However, to provide sufficient structural support for the structural parts, as understood in the art, the content of fibers is generally five percent (5%) to fifty percent (50%) by weight. It has been determined that the content of fibers is generally ten (10) to seventy (70) percent by weight, and preferably forty percent (40%) by weight to achieve the desired mechanical properties for the production of larger articles.

The average fiber length of the fibers is greater than about one-half inch (½"). However, typical structural parts produced by the extrusion-molding system 600a utilize fiber lengths longer than about one inch. It should be noted that when the average fiber length is less than one inch, the desired mechanical properties for large articles is difficult to obtain. Distribution of the fibers in the thermoplastic composite material is generally uniform so that the fibers and thermoplastic resin do not separate when melted and compressed. The distribution or disbursement of the fibers includes a process by which the fibers are dispersed from a single filament level to a level of multiple filaments (i.e., bundles of several tens of fibers). In one embodiment, bundles of about five fibers are dispersed to provide efficiency and structural performance. Further, the "degree of combing" may be evaluated by observing a section of the structure by a microscope and determining the ratio of the number of reinforcing fibers in bundles of ten or more in all of 1000 or more observable reinforcing fibers (total number of reinforcing fibers in bundles of 10 or more/total number of reinforcing fibers×100) (percent). Typical values produced by the principles of the present invention result in not more than approximately sixty percent (60%), and generally below thirty-five percent (35%).

Figure 6A:
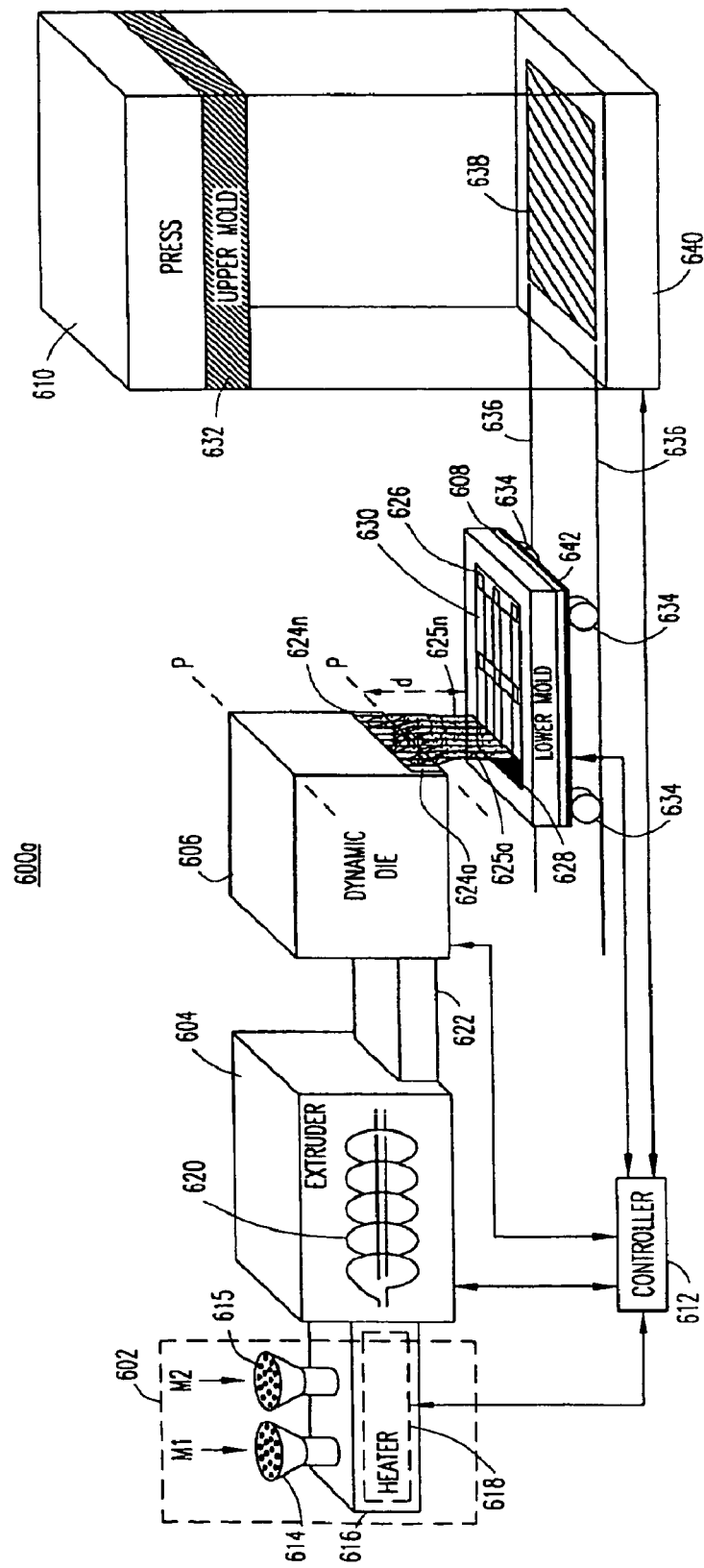
FIG. 6A is an exemplary schematic diagram of an extrusion-molding system according to FIG. 1 operable to form structural parts.

FIG. 6A is an exemplary schematic diagram of an extrusion-molding system 600a operable to form structural parts. The extrusion-molding system 600a is composed of a number of discrete components that are integrated to form structural parts from composite material. The components include a material receiving unit 602, a heater 618, an extruder 604, a dynamic die 606, a trolley 608, a compression press 610, and a controller 612. Other supplemental components may also be included to form the extrusion-molding system 600a.

The material receiving unit 602 may include one or more hoppers or feeders 614 and 615 for receiving materials M1 and M2, respectively, that will be extruded to form a thermoplastic composite. It should be understood that additional feeders may be utilized to receive additional materials or additives to formulate different compounds. In the instant example, materials M1 and M2 represent the starting material i.e., reinforced thermoplastic materials preferably in the form of pellets. M1 and M2 may be the same or different reinforced thermoplastic material. The thermoplastic materials may be reinforced by fibers, such as glass or carbon fibers, as understood in the art. It should be further understood that non-thermoplastic material may be utilized in accordance with the principles of the present invention.

A heater 618 preheats the thermoplastic materials M1 and M2. The extruder 604 is coupled to the feeder channel 616 and operable to mix the heated thermoplastic materials M1 and M2 via an auger 620. The extruder 604 further melts the thermoplastic materials. The auger 620 may be helical or any other shape operable to mix and flow the composite material through the extruder 604. An extruder output channel 622 is coupled to the extruder 604 and is utilized to carry the composite material to a dynamic die 606.

The dynamic die 606 includes multiple flow control elements 624a-624n (collectively 624). The flow control elements 624 may be individual gates, valves, or other mechanisms that operate to control the extruded composite material 625 from the dynamic die 606, where the extruded composite material 625a-625n (collectively 625) varies in volumetric flow rates across a plane P at or below the flow control elements 624. The outputting of the different volumetric flow rates ranges between approximately zero and 3000 pounds per hour. A more preferable range for the volumetric flow rate ranges between approximately 2500 and 3000 pounds per hour. In one embodiment, the flow control elements 624 are gates that are raised and lowered by separate actuators, such as electrical motors, (e.g., stepper motors), hydraulic actuators, pneumatic actuators, or other actuator operable to alter flow of the composite material from the adjustable flow control elements 624, individually or collectively. The flow control elements 624 may be adjacently configured to provide for a continuous separating adjacent flow control elements 624. Alternatively, the flow control elements 624 may be configured separately such that the composite material flowing from adjacent flow control elements 624 remains separated until the composite material spreads on a mold. It should be understood that the flow control elements 624 suitably may operate as a trimmer 17. In an embodiment of the invention, the molten composite material may be delivered to an accumulator, placed between the extruder 604 and the dynamic die 606, from which the composite material may be delivered into a lower mold using a plunger or other actuating mechanism.

The trolley 608 may be moved beneath the dynamic die 606 so that the extruded composite material 625 gravitates to or is deposited on a lower mold 626, which passes below the dynamic die 606 at a predetermined vertical distance, the "drop distance" (d). The lower mold 626 defines cavities 630 that are used to form a structural part. The extruded composite material 625 is deposited 628 on the lower mold 626 to fill the volume defined by the cavities 630 in the lower mold 626 and an upper mold 632 to form the composite part. In a two-axis controlled process, the composite material 625a may be deposited on the lower mold 626 at a substantially constant volumetric flow rate from the dynamic die 606 or across a vertical plane (P), based on discrete movement and variable speeds, to form the composite material layer 628 having substantially the same thickness or volume along the vertical plane (P) to fill the cavities 630 in the lower and upper molds 626 and 632. In a three-axis controlled process, the composite material may be deposited on the lower mold 626 at different volumetric flow rates from the dynamic die 606 across the vertical plane (P) to form the composite material layer 628 having different thickness or volume along the vertical plane (P) to fill the cavities 630 in the lower and upper molds 626 and 632. It should be understood that the two-axis controlled process may be utilized to deposit the composite material to molds that have cavities 630 substantially constant in depth in the vertical plane and that the three-axis controlled process may be utilized to deposit the composite to molds that have cavities 630 that vary in depth.

The trolley 608 may further include wheels 634 that provide for translation along a rail 636. The rail 636 enables the trolley 608 to roll beneath the dynamic die 606 and into the press 610. The press 610 operates to press the upper mold 632 into the lower mold 626. Even though the principles of the present invention provide for reduced force for the molding process than conventional thermoplastic molding processes due to the composite material layer 628 being directly deposited from the dynamic die 606 to the lower mold 626, the force applied by the press 610 is still sufficient to damage the wheels 634 if left in contact with the rail 636. Therefore, the wheels 634 may be selectively engaged and disengaged with an upper surface 638 of a base 640 of the press 610. In an embodiment, the trolley 608 is raised by inflatable tubes (not shown) coupled thereto so that when the tubes are inflated, the wheels 634 engage the rails 636 so that the trolley 608 is movable from under the die 606 to the press 610. When the tubes are deflated, the wheels 634 are disengaged so that the body of the trolley 608 is seated on the upper surface 638 of a base 640 of the press 610. It should be understood that other actuated structural components may be utilized to engage and disengage the wheels 634 from supporting the trolley 608, but that the functionality to engage and disengage the wheels 634 is to be substantially the same. For example, the upper surface 638 of the base 640 of the press 610 may be raised to contact the base plate 642 of the trolley 608.

The controller 612 is electrically coupled to the various components that form the extrusion-molding system 600. The controller 612 is a processor-based unit that operates to orchestrate the forming of the structural parts. In part, the controller 612 operates to control the composite material being deposited on the lower mold 626 by controlling temperature of the composite material, volumetric flow rate of the extruded composite material 625, and the positioning and rate of movement of the lower mold 626 via the trolley 608 to receive the extruded composite material 625. The controller 612 is further operable to control the heater 618 to heat the thermoplastic materials. The controller 612 may control the rate of the auger 620 to maintain a substantially constant flow of composite material through the extruder 604 and into the dynamic die 606. Alternatively, the controller 612 may alter the rate of the auger 620 to alter the volumetric flow rate of the composite material from the extruder 604. The controller may further control heaters (not shown) in the extruder 604 and the dynamic die 606. Based on the structural part being formed, a predetermined set of parameters may be established for the dynamic die 606 to apply the extruded composite material 625 to the lower mold 626. The parameters may be defined such that the flow control elements 624 may be selectively positioned such that the movement of the trolley 608 is positionally synchronized with the volumetric flow rate of the composite material in accordance with the cavities 630 that the define the structural part being produced.

The trolley 608 may further include a heater (not shown) that is controlled by the controller 612 and is operable to maintain the extruded composite material 625 in a heated or melted state. The controller may, by varying the required speeds of the trolley, control the trolley 608 during extruded composite material 625 being applied to the lower mold 626. Upon completion of the extruded composite material 625 being applied to the lower mold 626, the controller 612 drives the trolley 608 into the press 610. The controller then signals a mechanism (not shown) to disengage the wheels 634 from the track 636 as described above so that the press 610 can force the upper mold 632 against the lower mold 626 without damaging the wheels 634.

Figure 6B:
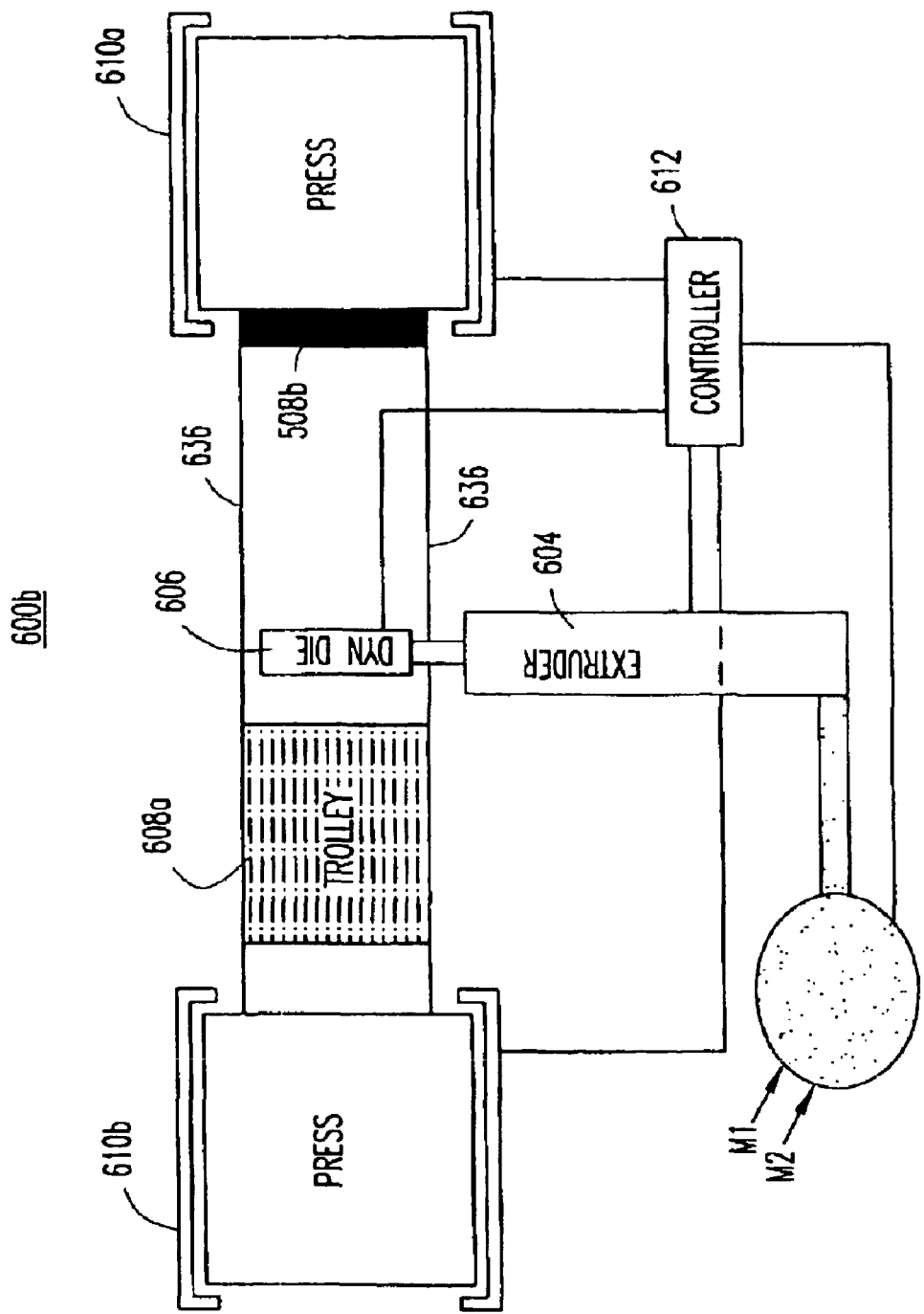
FIG. 6B is another exemplary block diagram of the extrusion-molding system 600a of FIG. 6A.

FIG. 6B is another exemplary block diagram of the extrusion-molding system 600a of FIG. 6A. The extrusion-molding system 600b is configured to support two presses 610a and 610b that are operable to receive the trolley 608 that supports the lower mold 626 to form the structural part. It should be understood that two trolleys 608 may be supported by the tracks or rails 636 so as to provide for forming multiple structural components by a single extruder 604 and dynamic die 606. While wheels 634 and rails 636 may be utilized to provide movement for the trolley 608 in one embodiment, it should be understood that other movement mechanisms may be utilized to control movement for the trolley 608. For example, a conveyer, suspension, or track drive system may be utilized to control movement for the trolley 608.

The controller 612 may be configured to support multiple structural parts so that the extrusion-molding system 600b may simultaneously form the different structural parts via the different presses 610a and 610b. Because the controller 612 is capable of storing parameters operable to form multiple structural parts, the controller 612 may simply alter control of the dynamic die 606 and trolleys 608a and 608b by utilizing the parameters in a general software program, thereby providing for the formation of two different structural parts using a single extruder 604 and dynamic die 606. It should be understood that additional presses 610 and trolleys 608 may be utilized to substantially simultaneously produce more structural parts via a single extruder 604 and dynamic die 606.

Figure 7:
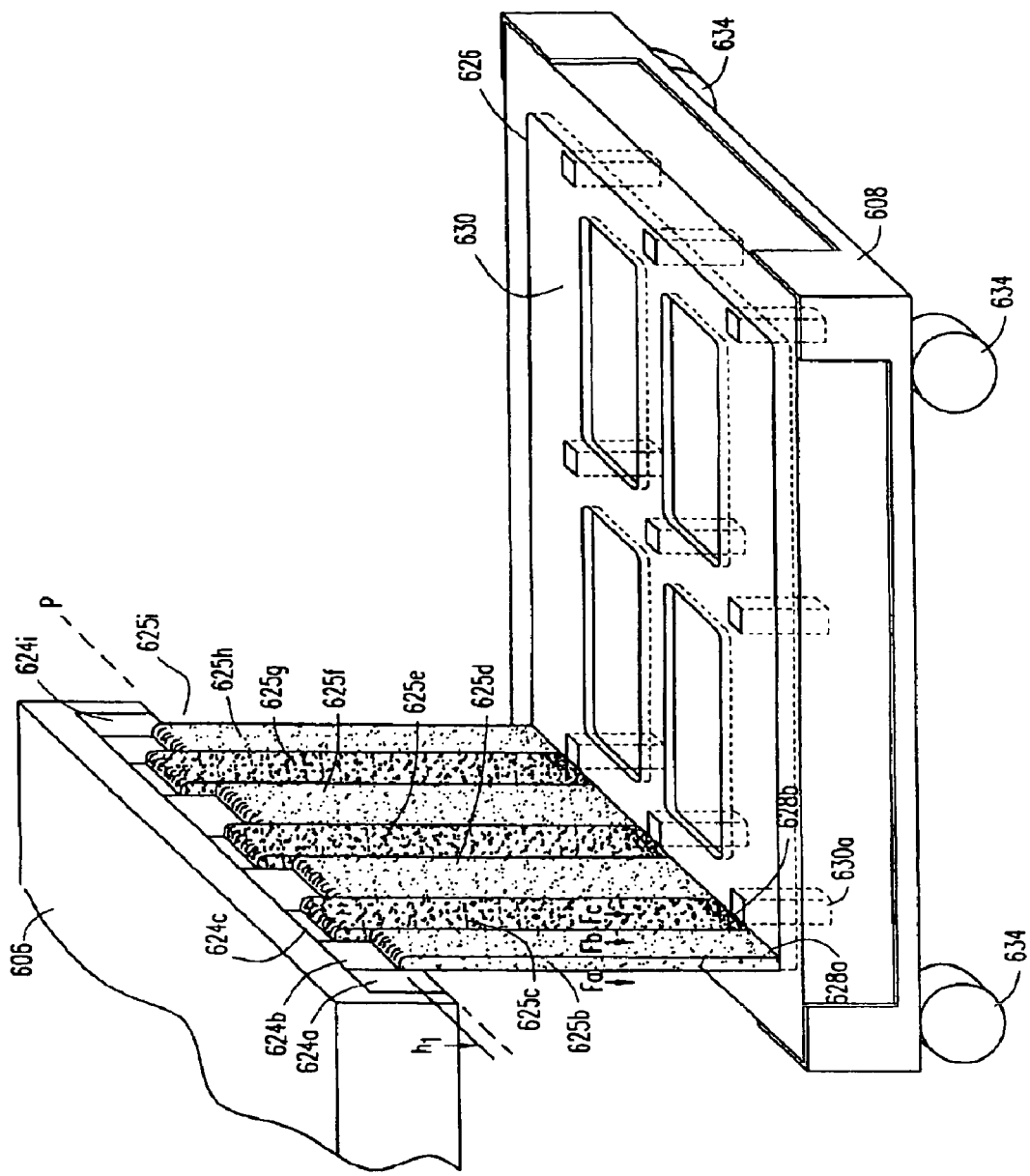
FIG. 7 is an exemplary exploded view of the dynamic die of FIG. 6A depositing the extruded composite material on the lower mold as supported by the trolley.

FIG. 7 is an exemplary exploded view of the dynamic die 606 depositing the extruded composite material 625 on the lower mold 626 as supported by the trolley 608. As shown, the dynamic die 606 includes the multiple flow control elements 624a-624i. It should be understood that the number of flow control elements 624 may be increased or decreased depending upon the resolution or detail of the structural part being formed. As shown, the flow control elements 624 are positioned at different heights so as to provide more or less volumetric flow rate of the extruded composite material 625 associated with each flow control element 624. For example, flow control element 624a is completely closed, so as to prevent composite material from being passed through that section of the dynamic die 606. The volumetric flow rate $f_a$ is therefore zero associated with the closed flow control element 624a. The flow control element 624b is opened to form an aperture having a height $h_1$, thereby providing a volumetric flow rate $f_b$ of the extruded composite material 625b. Similarly, the flow control element 624c is opened to form a larger aperture for the extruded composite material 625c to be output at a higher volumetric flow rate $f_c$ onto the lower mold 626.

As indicated by the variation in shading of the extruded composite material 625 associated with each of the flow control elements 624, the flow control elements 624 may be dynamically adjusted based on the structural part being formed via the lower and upper molds 626 and 632. Accordingly, based on the structural part being formed (e.g., deep draw over a certain region), the flow control elements 624 may be adjusted to alter the volumetric flow rates of the extruded composite material 625 over finite regions of the lower and upper molds 626. In other words, based on the cavities 630 defined by the lower and upper molds 626 and 632, the composite material layer 628 may be varied in thickness. For example, the composite material layer region 628a is thinner than composite material layer region 628b, which is thicker to sufficiently fill the cavity 630a, which has a deeper draft than other locations of the cavity 630 in the lower mold 626. In other words, the extruded composite material layer 628 is dynamically altered based on the depth of the cavity 630 defined by the molds 626 and 632. In both the two- and three-axis controlled processes capable of being performed on the extrusion-molding system 600a, the extruded composite material layer 628 may be dynamically altered in terms of thickness based on the volumetric flow rate of the extruded composite material 625 and the speed of travel of the trolley 608.

Depositing the extruded composite material onto the lower mold may be performed by controlling the amount of extruded composite material deposited in two or three axes depending on the structural part being produced. For the two-axis control, the movement of the trolley may be controlled along the axis of movement to deposit the extruded composite material in various amounts along the axis of deposit. For the three-axis control, the output of the extruder may utilize a dynamic die that includes flow control elements, thereby providing for different volumetric flow rates to be simultaneously deposited onto the lower mold along the axis perpendicular to the axis of movement. It should be understood that other embodiments may provide for off-axis or non-axis control to deposit the extruded composite material in specific locations on the lower mold.

By providing for control of the trolley and composite material being applied to the lower mold, any pattern may be formed on the lower mold, from a thick continuous layer to a thin outline of a circle or ellipse; any two-dimensional shape that can be described by discrete mathematics can be traced with material. Additionally, because control of the volume of composite material deposited on a given area exists, three-dimensional patterns may be created to provide for structural components with deep draft and/or hidden ribs, for example, to be produced. Once the structural part is cooled, ejectors may be used to push the consolidated material off of the mold. The principles of the present invention may be designed so that two or more unique parts may be produced simultaneously, thereby maximizing production efficiency by using a virtually continuous stream of composite material.

Value-Added Benefits of the Extrusion-Molding Process

With the extrusion-molding system, large long-fiber reinforced plastic parts may be produced in-line and at very low processing costs. Features of the extrusion system provide for a reinforced plastic components production line that offers (i) materials flexibility, (ii) deposition process, (iii) low-pressures, and (iv) machine efficiency. Materials flexibility provides for savings in both material and machine costs from in-line compounding, and further provides for material property flexibility. The deposition process adds value in the material deposition process, which allows for more complicated shapes (e.g., large draft and ribs), better material flow, and ease of inclusion of large inserts in the mold. The low-pressures is directed to reduced molding pressures, which lessen the wear on both the molds and the machines, and locks very little stress into the structural parts. The machine efficiency provides for the ability to use two or more completely different molds at once to improve the efficiency of the extrusion system, thereby reducing the required number of machines to run a production operation. Additionally, the material delivery system according to the principles of the present invention may be integrated with many existing machines.

Materials Flexibility

The extrusion-molding process allows custom composite blends to be compounded using several different types of resin and fiber. The extrusion system may produce parts with several resins as described above. With traditional compression molding, pre-manufactured thermoplastic sheets, commonly known as blanks that combine a resin with fibers and desired additives are purchased from a thermoplastic sheet producer. These blanks, however, are costly because they have passed through several middle-men and are usually only sold in predetermined mixtures. By utilizing the extrusion-molding process according to the principles of the present invention, these costs may be reduced by the in-line compounding process utilizing the raw materials to produce the structural parts without having to purchase the pre-manufactured sheets. Labor and machine costs are also dramatically reduced because the extrusion-molding system does not require ovens to pre-heat the material and operators to move the heated sheets to the mold. Since the operator controls the compounding ratios as desired, nearly infinite flexibility is added to the process, including the ability to alter properties while molding or to create a gradual change in color, for example. Also, unlike sheet molding, the extrusion-molding system does not require the material to have a melt-strength, giving the system added flexibility. In one embodiment, the extrusion-molding system may utilize thermoset resins to produce the structural parts. The extrusion-molding system may also use a variety of fiber materials, including carbon, glass and other fibers as described above, for reinforcement with achievable fiber volume fractions of over 50 percent and fiber lengths of one to four inches or longer with 85 percent or higher of the fiber length being maintained from raw material to finished part.

Deposition Process

The extrusion system, according to the principles of the present invention, allows for variable composite material laydown; in regions of the mold where more material is to be utilized for deep draft or hidden ribs, for example, thereby minimizing force utilized during molding and pressing. The variable composite material lay-down results in more accuracy, fuller molds, and fewer "short-shots" as understood in the art than with typical compression molding processes. Variable lay-down also allows for large features to be molded on both sides of the structural part, as well as the placement of inserts or cores into the structural part. Lastly, since the material has a relatively very low viscosity as it is being deposited in a molten state onto the mold (as opposed to being pre-compounded into a sheet and then pressed into a mold), fibers are able to easily enter ribs and cover large dimensional areas without getting trapped or becoming undesirably oriented.

Low-Pressures

The thermoplastic composite material being deposited during the extrusion-molding process is much more fluid than that from a heated pre-compounded sheet, thus allowing the thermoplastic composite material to flow much easier into the mold. The fluidity of the composite material being deposited onto the mold results in significantly reduced molding pressure requirements over most other molding processes. Presses for this process generally operate in the range of 100 pounds per square inch, compared with 1,000 pounds per square inch of pressure used for compression molding. This lower pressure translates to less wear, thereby reducing maintenance on both the molds and the press. Because of the lower pressures, instead of needing a steel tool that could cost over $200,000, an aluminum mold, capable of 300,000 cycles, and may be manufactured for as little as $40,000. Less expensive tooling also means more flexibility for future design changes. Since the thermoplastic resin is relocated and formed on the face of the mold under lower pressures, less stress is locked into the material, thereby leading to better dimensional tolerance and less warpage.

Machine Efficiency

Because the extrusion-molding process may use two or more molds running at the same time, there is a reduction in the average cycle time per part, thus increasing productivity as the first mold set may be cooled and removed while a second mold is filled and compressed. Also, the extrusion-molding system utilizes minimal redundant components. In one embodiment, the extrusion system utilizes a separate press for each mold, but other equipment may be consolidated and shared between the mold sets and may be easily modified in software to accommodate other molds. The extrusion and delivery system 600a further may be integrated into current manufacturing facilities and existing compression molds and presses may be combined.

Figure 8A:
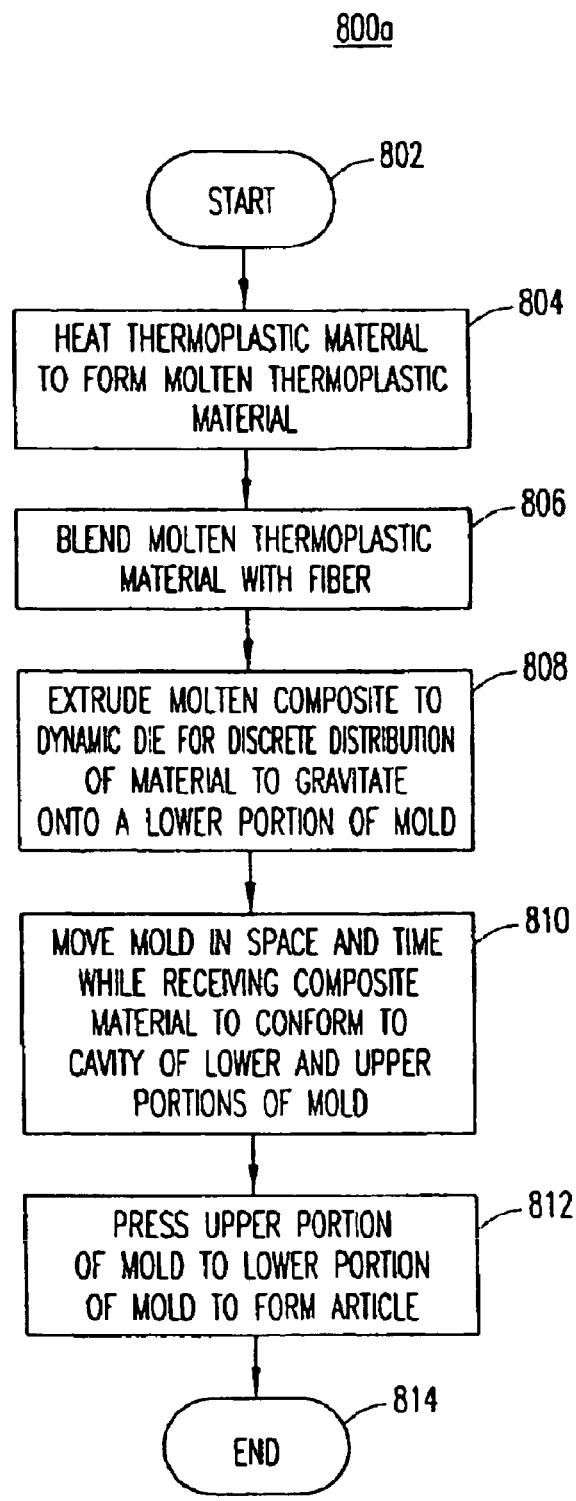
FIG. 8A is an exemplary flow diagram describing the extrusion-molding process that may be utilized to form articles or structural parts by using either two- or three-axis control for depositing the composite material onto the lower mold of FIG. 6A.

FIG. 8A is an exemplary flow diagram describing the extrusion-molding process that may be utilized to form articles or structural parts by using either two- or three-axis control for depositing the composite material onto the lower mold 626. The extrusion-molding process starts at step 802. At step 804, the thermoplastic material is heated to form molten thermoplastic material and blended with the fiber at step 802 to form a composite material. At step 708, the molten composite material is delivered through the dynamic die to gravitate onto a lower mold 626. For the two-axis extrusion deposit process, a fixed output from the die may be utilized. In a two-axis process, the movement of the trolley is maintained at a constant speed. In a three-axis extrusion control process, a dynamic die 606 may be utilized in conjunction with varying trolley or mold speeds. For both the two- and three-axis extrusion control process, the lower mold 626 may be moved in space and time while receiving the composite material to conform the amount of composite material required in the cavity 630 defined by the lower and upper molds 626 and 632 at step 810. At step 812, the upper mold 632 is pressed to the lower mold 626 to press the composite material into the lower and upper molds 626 and 632. The process ends at step 814.

Figure 8B:
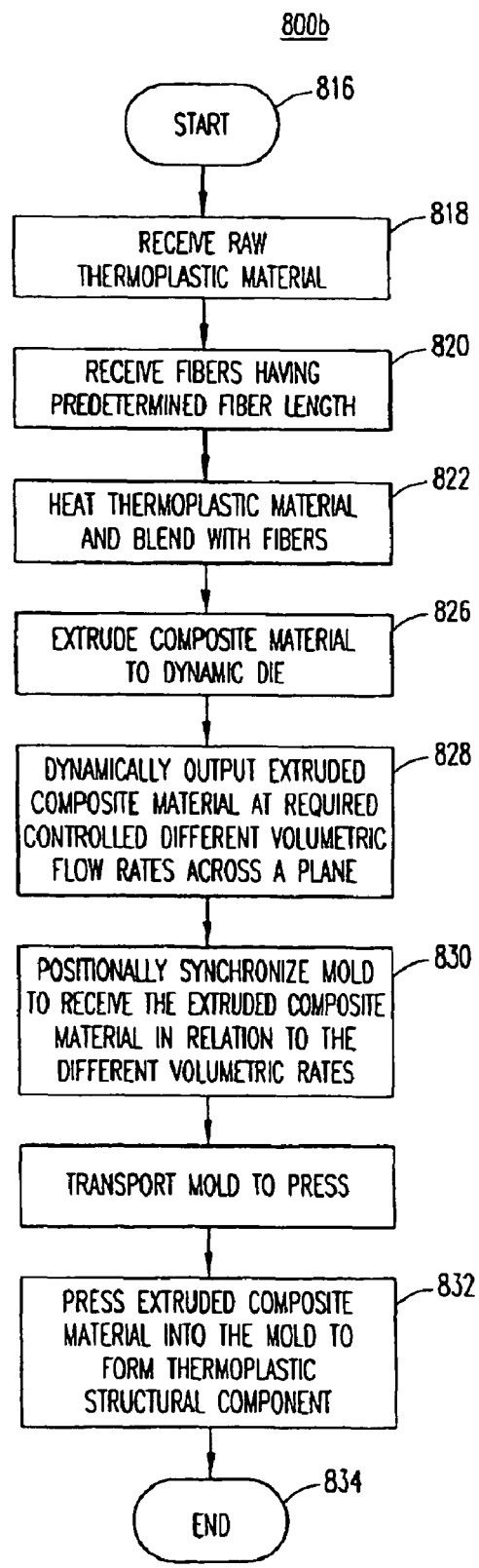
FIG. 8B is an another exemplary flow diagram for producing structural parts utilizing the extrusion-molding system of FIG. 6A via the three-axis control extrusion-molding process.

FIG. 8B is an exemplary flow diagram for producing structural parts utilizing the extrusion-molding system 600a of FIG. 6A via the three-axis control extrusion-molding process. The structural part production process starts at step 816. At step 818, thermoplastic material is received. The thermoplastic material is heated at step 822. In one embodiment, the thermoplastic material is heated to a melted or molten state. At step 820, fibers having a predetermined fiber length are received. At step 822, the fibers are blended with the heated thermoplastic material to form a composite material. The fibers may be long strands of fiber formed of glass or other stiffening material utilized to form large structural parts. For example, fiber lengths of one-half inch (½") up to four inches (4") or more in length may be utilized in forming the structural parts.

The composite material is extruded at step 826. In the extrusion process, the auger 620 or other mechanism utilized to extrude the composite material is configured to substantially avoid damaging the fibers such that the original fiber lengths are substantially maintained (e.g., 85 percent or higher). For example, in the case of using a screw type auger 620, the thread spacing is selected to be larger than the length of the fibers, thereby substantially avoiding damaging the fibers.

At step 828, the extruded composite material 625 may be dynamically output at different volumetric flow rates across a plane to provide for control of depositing the extruded composite material 625 onto the lower mold 626. The lower mold 626 may be positionally synchronized to receive the extruded composite material 625 in relation to the different volumetric flow rates across the plane P at step 830. In an embodiment, the positional synchronization of the mold 626 is performed in accordance with flow control elements 624 that are located at a height d above the trolley 608, which may be translated at a substantially constant or adjustable rate. For example, to deposit a constant or flat extruded composite material layer 628, the trolley 608 is moved at a substantially constant rate, but to increase or decrease the volume of the extruded composite material layer 628, the trolley 608 may be moved at a slower or faster rate, respectively. At step 832, the extruded composite material 625 that is formed into the extruded composite material layer 628 is pressed into the mold 626 to form the thermoplastic structural part. The structural part forming process ends at step 834.

Figure 9:
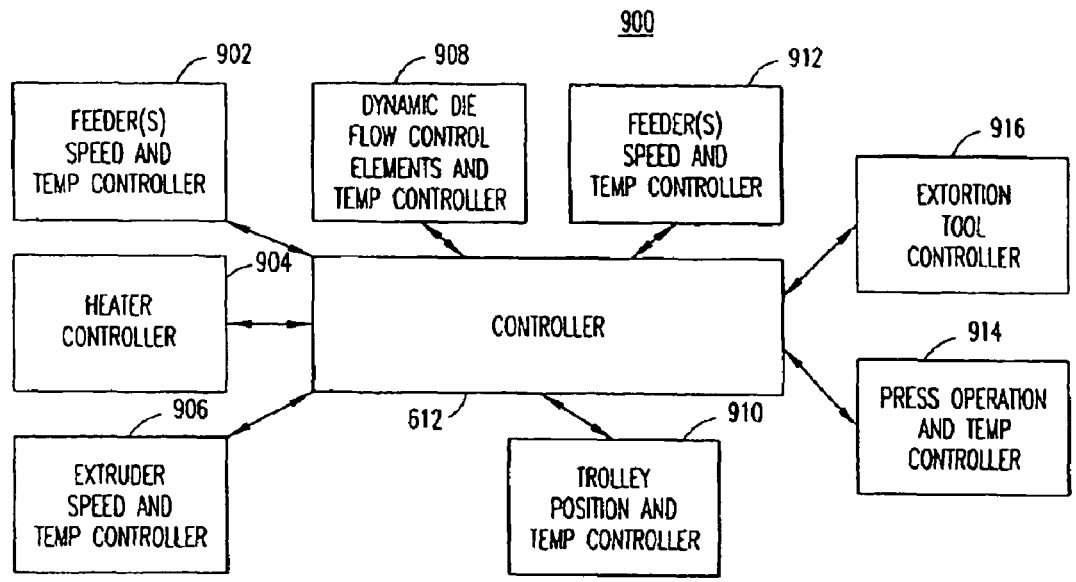
FIG. 9 is an exemplary block diagram of a controller of FIG. 6A interfacing with controllers operating in components of the extrusion-molding system of FIG. 6A.

FIG. 9 is an exemplary block diagram 900 of the controller 612 as configured to communicate with controllers operating within components of the extrusion system 600a of FIG. 6A. The controller 612 communicates with the various controllers for bidirectional communication using digital and/or analog communication channels as understood in the art. The controllers operating within the components may be processor based operating open or closed-loop control software as understood in the art and operate as slave computers to the controller 612. Alternatively, the controllers may be non-processor based controllers, such as analog or digital circuitry, that operate as slave units to the controller 612.

The feeder(s) 614 may include a speed and temperature controller 902 that is operable to control speed and temperature of the feeder(s) 614 for mixing the composite material M1 and fiber material M2. The feeder speed and temperature controller(s) 902 may be formed of single or multiple controllers to control motor(s) and heater(s). The controller 612 is operable to specify or command the velocity or rate and temperature of the feeder(s) 614, while the speed and temperature controller 802 of the feeder(s) 614 is operable to execute the commands received by the controller 812. For example, based on the amount of composite material being extruded via the dynamic die 606, the controller 612 may increase the rate of the materials M1 and M2 being fed into the extruder 606.

The controller 612 is further in communication with the heater controller 904. The controller 612 may communicate control data to the heater controller 904 based on feedback data received from the heater controller 904. For example, if the temperature of the heater controller 904 decreases during feeding operations, then the controller 612 may issue commands via the control data 1018 to the heater controller 904 to increase the temperature of the heater 618. Alternatively, the heater controller 904 may regulate the temperature utilizing a feedback regulator loop as understood in the art to the temperature commanded by the controller 612 and simply report the temperature to the controller 612 for monitoring purposes.

The controller 612 is further in communication with an extruder speed and temperature controller 906, which provides control over the speed of the auger 620 and temperature of the extruder 604. The extruder speed and temperature controller 906 may be operable to control multiple heaters within zones of the extruder 604 and communicate the temperatures of each heater to the controller 612. It should be understood that the extruder speed and temperature controller 906 may be formed of multiple controllers.

The controller 612 is further in communication with a dynamic die controller 908 that controls the flow control elements 624 of the dynamic die 606. The dynamic die controller 908 may operate to control each of the flow control elements 624 collectively or individually. Alternatively, each flow control element 624 may be individually controlled by separate controllers. Accordingly, the controller 612 may operate to issue commands to the dynamic die controller 908 to set the position for each of the flow control elements 624 in an open-loop manner. For example, a stepper motor may be utilized in an open-loop manner. Actual position of each flow control elements 624 may be communicated back to the controller 612 via the feedback data 1022 for the controller 612 to utilize in controlling the positions of the flow control elements 624.

The controller 612 is further in communication with a trolley controller 910 that is coupled to the trolley 608 and is operable to control position of the trolley 608 and temperature of the lower mold 626. The controller 612 may provide control signals 1018 to the trolley controller 910 that operates as a servo to drive the trolley 608 to the positions commanded by the controller 612, which, in the case of depositing the extruded composite material 625 onto the lower mold 626, positions the lower mold 626 accordingly. Although the extruded composite material layer 628 that is deposited onto the lower mold 626 is molten at the time of deposition, the extruded composite material layer 628 deposited first tends to cool as the later extruded composite material 625 is being deposited. Therefore, the controller 612 may communicate control data 1018 to the trolley controller 910 to maintain the temperature of the extruded composite material layer 628, either at a substantially constant temperature, based on time of deposition of the extruded composite material 625, and/or based on other factors, such as thermoplastic material M1 molten state temperature requirements. Feedback data 1022 may provide current temperature and status of the position and velocity of the trolley 608 and temperature of the lower mold 626 so that the controller 612 may perform management and monitoring functions.

The controller 612 is further in communication with a heat/cool controller 912, which is operable to control temperature of heaters and/or coolers for the extrusion-molding system 600a. The heat/cool controller 912 may receive the control data 1018 from the controller 612 that commands the heat/cool controller 912 to operate at a specific or variable temperature based on a number of factors, such as thermoplastic material M1, ambient temperature, characteristics of structural part being produced, production rates, etc. The heat/cool controller 912 may control system-level heaters and coolers or component-level heaters and coolers. Feedback data 1022 may provide current temperature and status of the heaters and coolers so that the controller 612 may perform management and monitoring functions.

The controller 612 is further in communication with a press controller 914, which is operable to control press operation and temperature of the upper mold 632. The press controller 914 may be a standard controller that the manufacturer of the press 610 supplies with the press 610. Similarly, the press controller 914 may include a temperature controller to control the temperature of the upper mold 932. Alternatively, the temperature controller may not be associated with the press controller 914 provided by the manufacturer of the press 910. Feedback data 612 may provide current position and force of the press and temperature of the upper mold 632 so that the controller 612 may perform management and monitoring functions.

The controller 612 is further in communication with an extraction tool controller 916 that is operable to control extraction operations on a molded structural component. In response to the controller 612 receiving notification from the press controller 914 that the press 610 has completed pressing operations, the controller 612 may issue control signals 1018 to the extraction tool controller 916 to initiate extraction of the molded structural component. Accordingly, feedback data 1022 may be utilized to indicate current operation of the extraction tool. If the feedback data 1022 indicates that the extraction tool is having difficulty extracting the molded structural component, an operator of the extrusion-molding system 600a may be notified that a problem exists with the extraction tool, the lower or upper molds 626 and 632, the press 610, the heater or cooler of the upper or lower mold 626 and 632, or other component or function of the extrusion-molding system 600a.

It should be understood that while the controller 612 may be configured to be a master controller for each of the components of the extrusion-molding system 600a, that the controller 612 may be configured to manage the components in a more distributed controller manner. In other words, the controllers of the components may operate as more intelligent controllers that use the parameters of the structural parts being produced to compute operating and control parameters and less as servos that are commanded by the controller 612 to perform a function. It should be further understood that the controller 612 may be programmed to accommodate different mechanical configurations of the extrusion-molding system 600a. For example, if the extrusion-molding system 600a were configured such that the output of the extruder 606 translated or otherwise moved relative to a stationary lower mold 626, which may or may not be coupled to a trolley 608, then the controller 612 may be programmed to control the movement of the output of the extruder 606 rather than movement of the trolley 608.

Figure 10:
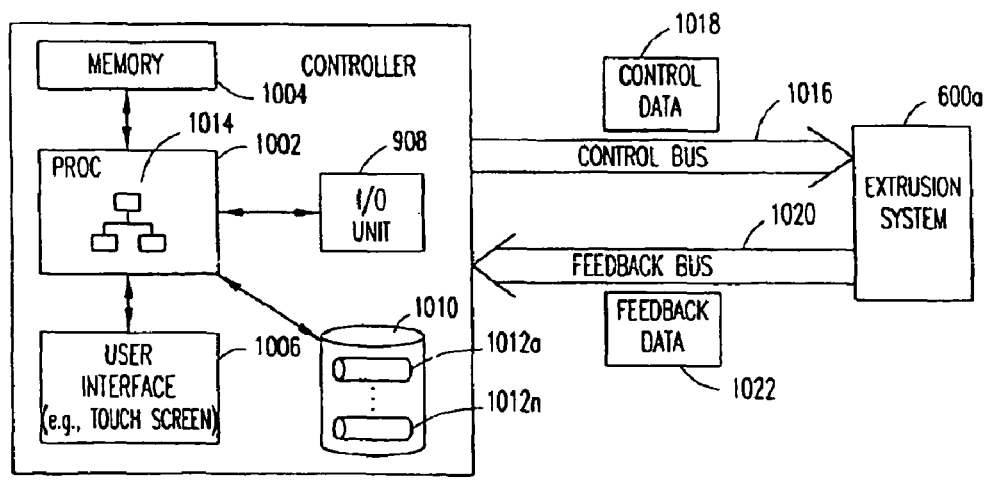
FIG. 10 is a more detailed exemplary block diagram of the controller of FIG. 6A.

FIG. 10 is an exemplary block diagram of the controller 612 of FIG. 6A. The controller 612 includes a processor 1002 coupled to a memory 1004 and user interface 1006. The user interface 1006 may be a touch screen, electronic display and keypad, pen-based interface, or any other user interface as understood in the art. The processor 1002 is further coupled to an input/output (I/O) unit and a storage unit 1010 that stores information in databases or files 1012a-1012n (collectively, 1012). The databases 1012 may be utilized to store control parameters for controlling the extrusion-molding system 600a, such as data associated with the lower and upper molds 626 and 632. The databases 1012 additionally may be utilized to store data fed-back from the extrusion system 600a during operation thereof.

The processor 1002 is operable to execute software 1014 utilized to control the various components of the extrusion-molding system 600a and to manage the databases 1012. In controlling the extrusion-molding system 600a, the software 1014 communicates with the extrusion-molding system 600a via the I/O unit 1008 and control bus 1016. Control data 1018 is communicated via data packets and/or analog control signals across a control bus 1016 to the extrusion-molding system 600a. It should be understood that the control bus 1016 may be formed of multiple control busses, whereby each control bus is associated with a different component of the extrusion-molding system 600a. It should be further understood that the control bus 1016 may operate utilizing a serial or parallel protocol.

A feedback bus 1020, which may be a single or multiple bus structure, is operable to feedback data 1022 from the extrusion-molding system 600a during operation. The feedback data 1022 may be sensory data, such as temperature, position, velocity, level, pressure or any other sensory information measured from the extrusion-molding system 600a. Accordingly, the I/O unit 1008 is operable to receive the feedback data 1022 from the extrusion-molding system 600a and communicate the feedback data 1022 to the processor 1002 to be utilized by the software 1014. The software 1014 may store the feedback data in the database 1012 and utilize the feedback data 1022 to control the components of the extrusion-molding system 600a. For example, in the case of the temperature of the heater being fed-back by the heater controller 904 to the controller 612, if the temperature of the heater 618 becomes too low, then the controller 612 may issue a command via the control data 1018 to the heater 618 to increase the temperature thereof. The controller 612 or component (e.g., heater) may include an automatic control system as understood in the art for performing the control and regulation of the component.

In operation, the controller 612 may store control parameters for producing one or more structural parts by the extrusion-molding system 600a. For example, data associated with parameters of the molds 626 and 632, such as dimensions of the cavities 630, may be stored in the database 1012. By storing multiple sets of parameters for various structural parts, the extrusion-molding system 600a may be utilized to form the structural parts substantially simultaneously. The processor 1002 may execute the software 1014 with the different sets of parameters in parallel to form the structural parts substantially simultaneously. That is, when one structural part is being pressed, another may be formed via the dynamic die 606 by applying the extruder composite material 625 onto the lower mold 626.

Figure 11:
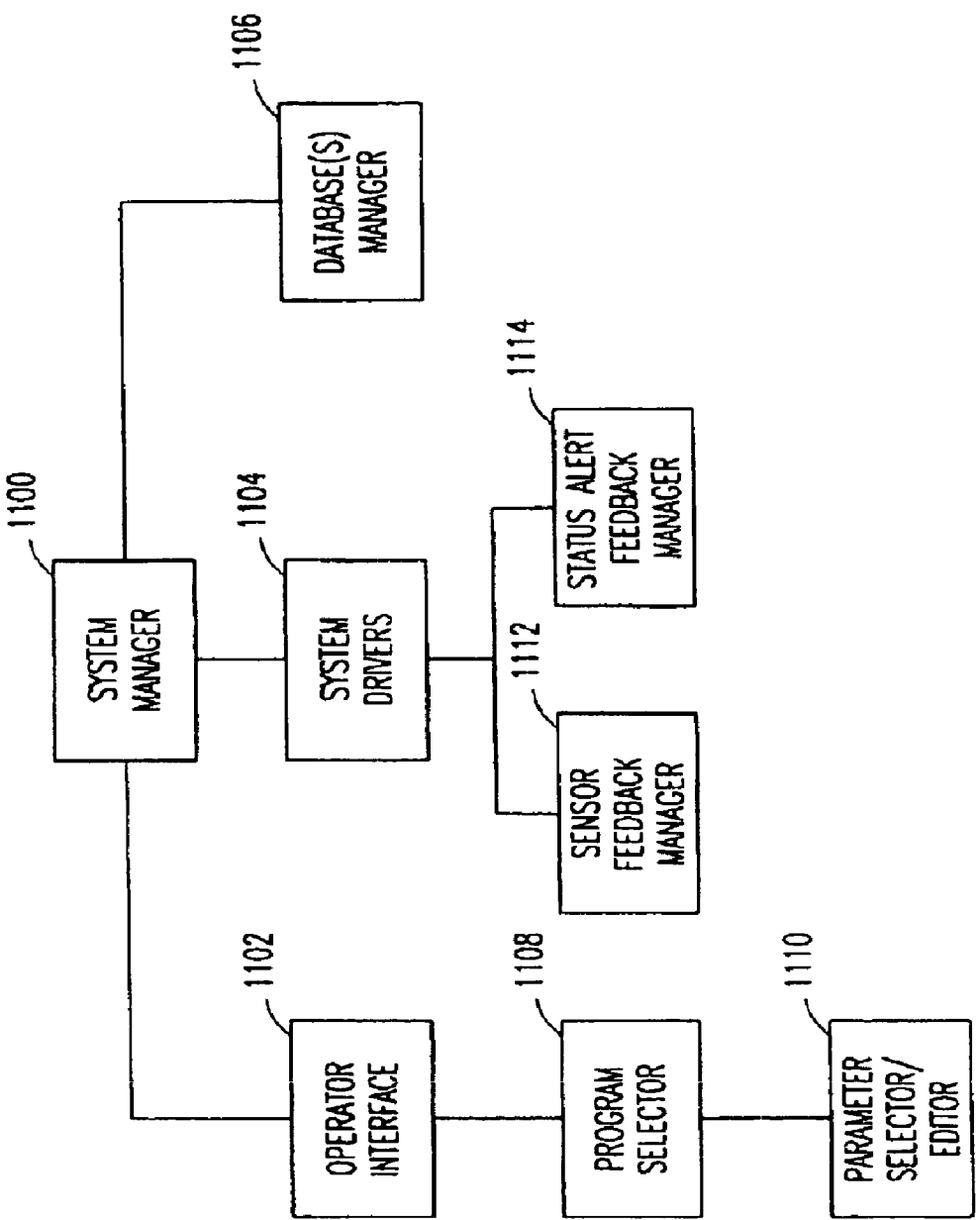
FIG. 11 is an exemplary block diagram of the software that is executed by a processor operating the controller of FIG. 10.

FIG. 11 is an exemplary block diagram of the software 1014 that is executed by the processor 1002. A system manager 1100 is operable to manage various aspects of the controller 612. The system manager 1100 interfaces with an operator interface 1102, system drivers 1104, and a database manager 1106.

The operator interface 1102 is utilized to provide an interface for an operator of the extrusion-molding system 600a to control the extrusion-molding system 600a manually or establish programs and/or profiles for producing structural parts. The operator interface 1102 communicates with a program selector 1108, which, when previously programmed, allows the operator to select programs for producing the structural parts. For example, a program that is established to produce a pallet may be selected via the operator interface 1102 by an operator so as to control the extrusion-molding system 600a to produce the pallet as defined by a designer of the pallet in accordance with the lower and upper molds 626 and 632. In one embodiment, the program selector 1108 merely selects a generic program that produces specific structural parts by controlling the extrusion-molding system 600a by utilizing a specific sets of parameters for controlling the components accordingly. The program selector 1108 may communicate with a parameter selector/editor 1110 that allows the operator to select a particular set of parameters to form a particular structural part and/or edit the parameters to alter the process for forming the structural part. The parameter selector/editor 1110 may interface with the database manager 1106 for selecting a particular set of parameters from a variety of different parameter datafiles available for the controller 612 to drive the components of the extrusion-molding system 600a to form different structural parts. For example, the database manager 1106 may have access to a set of parameters for producing a pallet, I-beam, backboard, etc. It should be understood that each of the components of the extrusion-molding system 600a may be controlled by generic drivers and that the parameters selected for producing a structural part may alter the behavior of each of the components of the extrusion-molding system 600a accordingly.

The system drivers 1104 may be utilized to integrate with the components of the extrusion-molding system 600a as understood in the art. For example, individual system drivers 1104 may be utilized to control the feeders 614, heater 618, extruder 604, dynamic die 606, trolley 608, and press 610. The system drivers 1104 may be customized by the operator of the extrusion-molding system 600a or be a generic driver provided by a manufacturer of a particular component, such as the press 610. During operation of the extrusion-molding system 600a producing a structural part, the system drivers 1104 may utilize the parameters selected to produce the structural part to drive the components of the extrusion-molding system 600a.

In controlling the components of the extrusion-molding system 600a, a database 1012 and status alert feedback manager 1114 are utilized to provide feedback control for each of the components of the extrusion-molding system 600a. For example, the heater 618 may feedback the actual temperature via a temperature sensor (not shown). Based on the measured temperature of the heater 618, a system driver 1104 utilized to control the heater 618 may increase or decrease the temperature of the heater 618 in accordance with the actual temperature measurement. Accordingly, other sensors may be utilized to feedback temperature, pressure, velocity, weight, position, etc., of each component and/or composite material within the extrusion-molding system 600a. In the case of a critical failure of a component, alerts may be fed-back to the controller 612 and detected by the status alert feedback manager 1114. If an alert is deemed to be a major failure, the system drivers 1104 may shut down one or more components of the extrusion-molding system 600a to prevent damage to hardware or personal injury to an operator. In response to such an alert, the system manager 1100 may trigger the operator interface 1102 to display the failure and provide notice as to corrective actions or otherwise.

Figure 12:
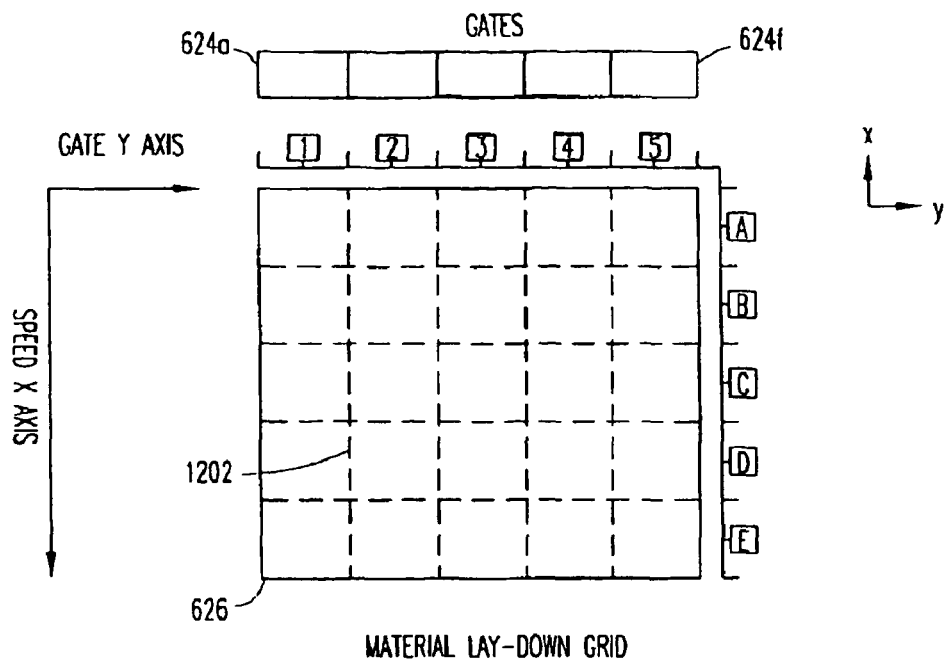
FIG. 12 is an exemplary schematic of the flow control elements and a lower mold, which is sectioned into a grid, to deposit extruded composite material in accordance with the extrusion-molding system of FIG. 6A.

FIG. 12 is an exemplary schematic of the flow control elements 624a-624f and lower mold 626, which is sectioned into a grid 1202. The grid spacings are defined by the flow control elements 624 along the y-axis (identified as spacings 1-5) and defined by spacings a-e along the x-axis. It should be understood that a higher resolution for the grid may be attained by utilizing more flow control elements 624 along the y-axis and defining smaller spacings along the x-axis. Depending upon the particular structural part being formed, higher or lower resolutions may be desired and parameters established by the operator to define the higher or lower resolutions may be stored in the controller 612 via the database manager 1106 for use in producing the structural parts.

TABLES 2-10 are exemplary data tables that are utilized to control the components of the extrusion-molding system 600a. Specifically, the tables provide for the control data 1018 for controlling the components and feedback data 1022 received by the controller 612 from the components. TABLE 2 provides for control of the feeders 614 that are used to feed thermoplastic composite material M1, fiber material M2, and any other materials (e.g., color) to form the structural parts. As shown, the control data 1018 includes the rate that each feeder 614 is delivering material to the extrusion-molding system 600a and the feedback data 1022 includes the level of the material currently in each feeder 614. During operation of the extrusion-molding system 600a, the rate of the material being delivered from the feeder 614 is controlled and level of the material in the feeders 614 is measured, the operator may be notified of the level of the material in response to the in the feeder 614 reaching a minimum amount so that the operator may apply additional material to the feeder 614.

TABLE 2

Material Feeders

| Control Data | Feedback Data |
| --- | --- |
| Rate of Feed Material 1 | Level of Material 1 |
| Rate of Feed Material 2 | Level of Material 2 |
| Rate of Feed Material 3 | Level of Material 3 |
| . . . | . . . |
| Rate of Feed Material n | Level of Material n |

TABLE 3 is an exemplary table that provides for temperature control for heaters in the extruder 604. In the case that the extruder 604 is defined as having seven temperature zones 1-n, the temperatures for each zone may be set by the extruder temperature control being defined as being set to heat or cool, on or off, and/or a specific temperature (not shown). The feedback data 1022 may include the actual temperature of each zone of the extruder 604. Accordingly, temperature sensors are integrated into each zone of the extruder 604 and the temperatures sensed are fed-back via the feedback bus 1020 to the controller 612 for feedback control.

TABLE 3

Extruder Temperature Control

| | Control Data | | |
| --- | --- | --- | --- |
| Zone | Extruder Temperature Control | On/Off | Feedback Data |
| 1 | Heat/Cool | On/Off | Actual Temp |
| 2 | Heat/Cool | On/Off | Actual Temp |
| 3 | Heat/Cool | On/Off | Actual Temp |
| . . . | . . . | . . . | . . . |
| 7 | Heat/Cool | On/Off | Actual Temp |

TABLE 4 is an exemplary table that provides for speed control for a motor (not shown) driving the auger 620 operating in the extruder 604. The control data 1018 includes a speed control setting to drive the motor. Actual speed and load of the motor are fed-back via the feedback data 1022 to the system driver 1104 utilized to control the rate of the auger 620 extruder 604 via the control data 1018.

TABLE 4

Extruder Motor Control

| Control Data | Feedback Data |
| --- | --- |
| Speed Control Signal | Actual Speed of Motor |
| | Actual Load of Motor |

TABLE 5 defines the temperature control for heaters in the dynamic die 606. The control data 1018 may be defined by zones 1-n within the dynamic die 606. Similar to the temperature control of the extruder 604, the heater 618 may include heating and cooling controls and/or on and off settings for controlling and/or regulating the temperature of the different zones within the dynamic die 606. Accordingly, the feedback data 1022 may include the actual temperature for each of the zones within the dynamic die 606 for control thereof.

TABLE 5

Dynamic Die Temperature Control

Control Data

| Zone | Dynamic Die Temp Control | On/Off | Feedback Data |
|---|---|---|---|
| 1 | Heat/Cool | On/Off | Actual Temp |
| 2 | Heat/Cool | On/Off | Actual Temp |
| 3 | Heat/Cool | On/Off | Actual Temp |
| ... | ... | ... | ... |
| N | Heat/Cool | On/Off | Actual Temp |

TABLE 6 is an exemplary table for control of the flow control elements 624 of the dynamic die 606. As shown, the control data includes flow control elements 1-n and positions for each flow control element 624 ranging from 1-m. It should be understood that the flow control elements 624 may have a nearly infinite number of positions. However, for practical purposes, the flow control element positions are typically set to have certain predetermined positions, such as each quarter-inch ranging from zero to six inches, for example. In controlling the positions of the flow control elements 624, a stepper motor or other type of motor may be utilized. Accordingly, the feedback data 1022 for the flow control elements 624 include the current positions of the flow control elements 624 so that any deviation of position between the control data 1018 communicated by the controller 612 to the dynamic die 606 may be corrected by a feedback loop via the feedback data 1022 as understood in the art.

TABLE 6

Dynamic Die Flow Control Element Control

Control Data

| Flow Control Element | Position | Feedback Data |
|---|---|---|
| 1 | Position 1-m | Current Position |
| 2 | Position 1-m | Current Position |
| 3 | Position 1-m | Current Position |
| ... | ... | ... |
| N | Position 1-m | Current Position |

TABLE 7 is an exemplary table that provides for temperature control for the lower mold 626. It should be understood that a similar table may be utilized to control the temperature of the upper mold 632. As shown, the lower mold 626 may be segmented into a number of zones 1-n, where heaters and/or coolers may be applied to each zone to heat and cool the lower mold 626 as commanded by the control data 1018. Accordingly, feedback data 1022 may provide for the actual temperature of the lower mold 626 so that feedback control may be performed by the controller 612 to regulate the temperature of the lower mold 626. For example, as the extruded composite material 625 is applied to the lower mode 626, the temperature of the lower mold 626 may be regulated across the zones to regulate the temperature of the extruded composite material layer 628 based on time and other factors as the composite material is deposited onto the lower mold 626 and until the structural part is removed from the molds 626 and 632.

TABLE 7

Heat/Cool Mold Control

Control Data

| Zone | Mold Temp Control | On/Off | Feedback Data |
|---|---|---|---|
| 1 | Heat/Cool | On/Off | Actual Mold Temp |
| 2 | Heat/Cool | On/Off | Actual Mold Temp |
| 3 | Heat/Cool | On/Off | Actual Mold Temp |
| 4 | Heat/Cool | On/Off | Actual Mold Temp |
| ... | ... | ... | ... |
| N | Heat/Cool | On/Off | Actual Mold Temp |

TABLE 8 is an exemplary table that provides exemplary control parameters for controlling the trolley 608. As shown, the control data 1018 includes position, speed, and lift control for the trolley 608. It should be understood that additional control data 1018 may be included to control motion of the trolley 608. For example, acceleration, rotation or angular position, or other dynamic control data may be utilized to move or synchronize the trolley 608 to properly align the lower mold 626 with respect to the application of the extruded composite material 625 being deposited or gravitated onto the lower mold 626. The feedback data 1022 for the trolley 608 may include actual position and current speed of the trolley 608. The lift control data may be utilized to engage and disengage the wheels 634 of the trolley 608 both during depositing of the extruded composite material 625 to the lower mold 626 and pressing the extruded composite material layer 628 into the molds 626 and 632 via the press 610, respectively. The actual position of the lift may be fed-back so as to ensure that the press 610 is not activated until the wheels 634 are disengaged via the lift mechanism (e.g., air tubes).

TABLE 8

Trolley Control

| Control Data | Feedback Data |
|---|---|
| Position Control Data | Actual Position of Trolley |
| Speed Control Data | Current Speed of Trolley |
| Lift Control Data | Actual Position of Lift |

TABLE 9 is an exemplary table that provides for control of the press 610. The control data 1018 may include lock control data and cycle press time. The feedback data 1022 may include position of the trolley 608 in the press 610 and position of the press platen. Other control and feedback parameters additionally may be included to control the press. For example, temperature control of the upper mold 632, force of the press 610, etc., may also be included.

TABLE 9

Press Control

| Control Data | Feedback Data |
|---|---|
| Lock Control Data | Trolley Position in Press |
| Cycle Press Time | Position of Press Platen |

TABLE 10 provides an exemplary table for control of an extraction tool (not shown) for extracting a formed structural part from the molds 626 and 632 after completion of the pressing and, optionally, cooling processes in forming the structural part. The control data 1018 may include a start extraction cycle and feedback data 1022 may include a single extraction tool position. It should be understood that multiple extraction tools or elements of an extraction tool may be utilized and other sensory feedback data may be sensed and fed-back to the controller 612.

TABLE 10

Extraction Tool Control

| Control Data | Feedback Data |
|---|---|
| Start Extraction Cycle | Extraction Tool Position |

Figure 13:
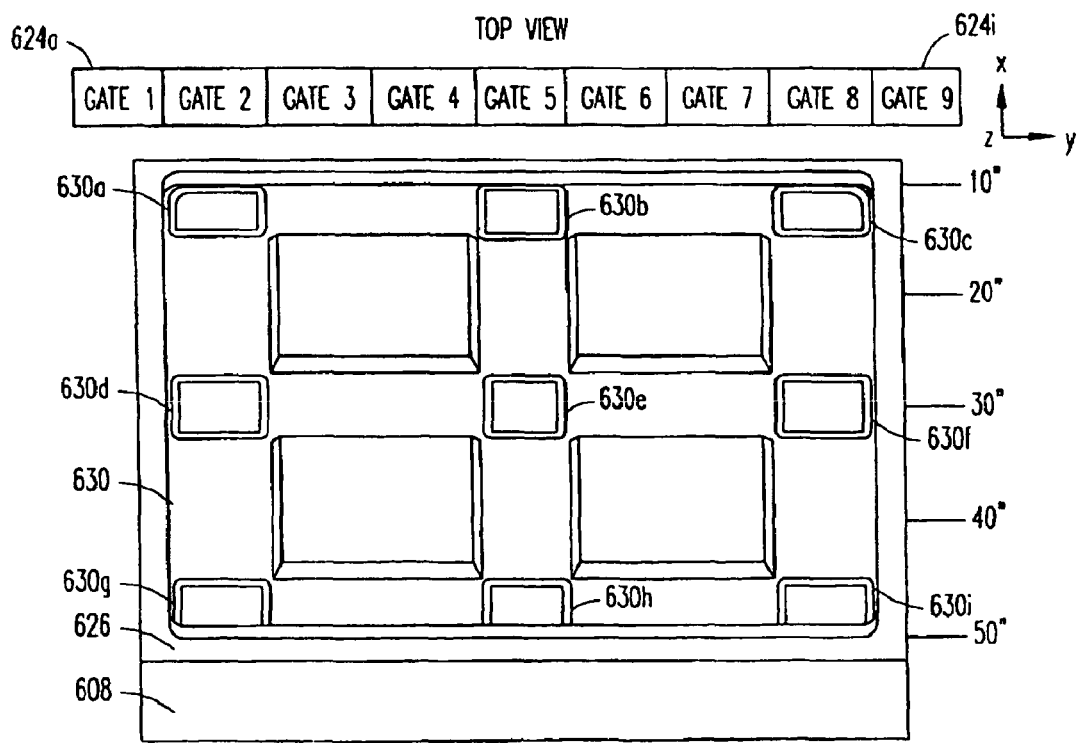
FIG. 13 is a top view of the flow control elements as aligned to deposit the composite material onto the lower mold of FIG. 6A.

FIG. 13 is a top view of the flow control elements 624a-624i as aligned to deposit the composite material onto the lower mold 626 of FIG. 6A. As shown, the flow control elements 624 are positioned along the y-axis, which provides for three-axis control for depositing the extruded composite material 625 onto the lower mold 626. Accordingly, the x-axis control for depositing the extruded composite material 625 may be provided by control of the movement of the trolley 608 at different speeds below the flow control elements 624, the y-axis control for depositing the extruded composite material 625 may be provided by the adjustment of the flow control elements 624, and the z-axis control for depositing the extruded composite material 625 may result from controlling the deposition of the extruded composite material 625 along the x- and y-axes.

Control for depositing the extruded composite material 625 along the x-, y-, and z-axes may be performed using a variety of techniques, including: (1) controlling the volumetric flow rate of the composite material from the extruder 604 via the rate of rotation of the auger 620; (2) controlling the rate of movement of the trolley 608 in a single axis; (3) controlling the aperture of the output of the extruder 604 having a single flow control element 624 or multiple flow control elements 624 operating uniformly; (4) individually controlling the multiple flow control elements 624; and (5) controlling motion of the trolley 608 in multiple axes. Each of these techniques assume that other variables are held constant. For example, technique (1) assumes that the output aperture of the extruder 604 is fixed and that the trolley 608 travels at a constant rate below the output aperture. Technique (2) assumes that the volumetric flow rate of the composite material from the extruder 604 is constant and that the output aperture of the extruder 604 is fixed. It should be understood, however, that the techniques may be combined to provide additional control of the placement of the extruded composite material 625 onto the lower mold 626 as discussed with regard to FIG. 6A, where techniques (1), (2), and (4) are combined. Technique (5) includes providing not only x-axis and y-axis control over lower mold 626, but also z-axis and rotation about any number of axes. By providing such control over the lower mold 626 using technique (5), a variety of structural parts may be formed that may not be possible otherwise. In sum, the overall computer control of the various elements of the inventive process serves a critical role in the coordination of the extrusion process and the production of a desired part and the overall operability of the process.

Finally, rather than controlling movement of the lower mold 626, the extruded composite material 625 may be deposited onto a stationary or moving lower mold 626 using moving output apertures from the extruder 604. For example, output apertures traveling along rails or other mechanical structure may be controlled to deposit the composite material in specific locations on the lower mold 626. An analogy for such a mechanism is a laser jet printer.

Referring again to FIG. 13, the flow control elements 624 are shown in relation to the lower mold 626 as it passes under the dynamic die 606 and the numbers of the right side correspond with the position of the trolley 608 in inches as it passes under the dynamic die 606. The lower mold 626 starts ten inches into the trolley 608 due to the lower mold 626 being smaller than the trolley 608. TABLES 11-12 are exemplary tables that provide parameters for speed and gate control for the flow control elements 624. The parameters may be utilized to produce the pallet utilizing the extrusion-molding system 600a.

TABLE 11

Trolley Speed Control Parameters

| Zone | Control (%) | Rate (ft/min) | Start Position (inches) | End Position (inches) |
|---|---|---|---|---|
| 1 | 0.50 | 6.67 | 0.0 | 10.0 |
| 2 | 2.00 | 1.67 | 10.0 | 15.0 |
| 3 | 1.00 | 3.33 | 15.0 | 27.0 |
| 4 | 2.00 | 1.67 | 27.0 | 33.0 |
| 5 | 1.00 | 3.33 | 33.0 | 45.0 |
| 6 | 2.00 | 1.67 | 45.0 | 50.0 |

TABLE 12

Flow Control Element Parameters

| Gate | Zone | Height (inches) | Start Position (inches) | End Position (inches) |
|---|---|---|---|---|
| 1 | 1 | 0.00 | 0.0 | 50.0 |
| 2 | 1 | 0.00 | 0.0 | 10.0 |
| 2 | 2 | 1.00 | 10.0 | 15.0 |
| 2 | 3 | 0.50 | 15.0 | 27.0 |
| 2 | 4 | 1.00 | 27.0 | 33.0 |
| 2 | 5 | 0.50 | 33.0 | 45.0 |
| 2 | 6 | 1.00 | 45.0 | 50.0 |
| 3 | 1 | 0.00 | 0.0 | 10.0 |
| 3 | 2 | 0.50 | 10.0 | 15.0 |
| 3 | 3 | 0.00 | 15.0 | 27.0 |
| 3 | 4 | 0.50 | 27.0 | 33.0 |
| 3 | 5 | 0.00 | 33.0 | 45.0 |
| 3 | 6 | 0.00 | 45.0 | 50.0 |
| 4 | 1 | 0.00 | 0.0 | 10.0 |
| 4 | 2 | 0.50 | 10.0 | 15.0 |
| 4 | 3 | 0.00 | 15.0 | 27.0 |
| 4 | 4 | 0.50 | 27.0 | 33.0 |
| 4 | 5 | 0.00 | 33.0 | 45.0 |
| 4 | 6 | 0.00 | 45.0 | 50.0 |
| 5 | 1 | 0.00 | 0.0 | 10.0 |
| 5 | 2 | 1.00 | 10.0 | 15.0 |
| 5 | 3 | 0.50 | 15.0 | 27.0 |
| 5 | 4 | 1.00 | 27.0 | 33.0 |
| 5 | 5 | 0.50 | 33.0 | 45.0 |
| 5 | 6 | 1.00 | 45.0 | 50.0 |
| 6 | 1 | 0.00 | 0.0 | 10.0 |
| 6 | 2 | 0.50 | 10.0 | 15.0 |
| 6 | 3 | 0.00 | 15.0 | 27.0 |
| 6 | 4 | 0.50 | 27.0 | 33.0 |
| 6 | 5 | 0.00 | 33.0 | 45.0 |
| 6 | 6 | 0.00 | 45.0 | 50.0 |
| 7 | 1 | 0.00 | 0.0 | 10.0 |
| 7 | 2 | 0.50 | 10.0 | 15.0 |
| 7 | 3 | 0.00 | 15.0 | 27.0 |
| 7 | 4 | 0.50 | 27.0 | 33.0 |
| 7 | 5 | 0.00 | 33.0 | 45.0 |
| 7 | 6 | 0.00 | 45.0 | 50.0 |
| 8 | 1 | 0.00 | 0.0 | 10.0 |
| 8 | 2 | 1.00 | 10.0 | 15.0 |
| 8 | 3 | 0.50 | 15.0 | 27.0 |
| 8 | 4 | 1.00 | 27.0 | 33.0 |
| 8 | 5 | 0.50 | 33.0 | 45.0 |

TABLE 12-continued

Flow Control Element Parameters

| Gate | Zone | Height (inches) | Start Position (inches) | End Position (inches) |
|------|------|-----------------|-------------------------|------------------------|
| 8 | 6 | 1.00 | 45.0 | 50.0 |
| 9 | 1 | 0.00 | 0.0 | 50.0 |

TABLES 11 and 12 provide for the positional synchronization between the flow control elements 624 and the movement of the trolley 608. By orchestrating the movement between the two components (i.e., dynamic die 606 and trolley 608), the extruded composite material 625 may be deposited at positions along the lower mold 626 as specified by the volume of the cavities 630 of the lower and upper molds 626 and 632. In other words, the extruded composite material 625 is deposited onto the lower mold 626 to form the extruded composite material layer 628 thick enough to fill the cavities 630 of the lower and upper molds 626 and 632, thereby providing the ability to form deep drafts and hidden ribs in certain locations of structural parts.

Figure 14:
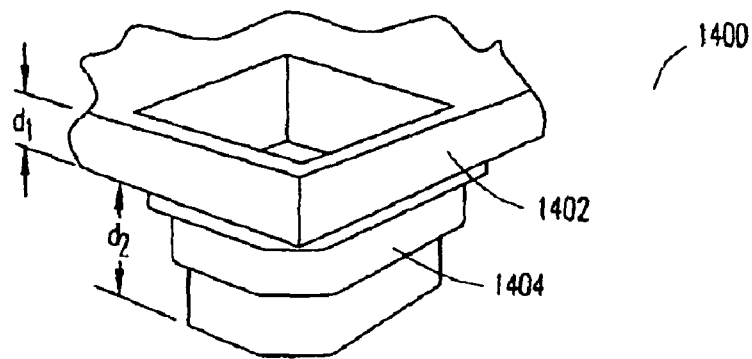
FIG. 14 is an exemplary perspective top view of a corner of a pallet produced by the extrusion-molding system of FIG. 6A.

FIG. 14 is an exemplary perspective top view of a corner of a pallet 1400 produced by the extrusion-molding system 600a of FIG. 6A. As shown, the draft or depth $d_1$ of the base 1402 of the pallet 1400 is shallower than the depth d2 of a foot 1404 of the pallet 1400. By controlling the deposition of the extruded composite material 625 onto the lower mold 626 utilizing the principles of the present invention, large structural parts having features, such as the foot 1404, having a deeper draft $d_2$ in specific regions of the structural parts may be formed using stiffener material M2 (e.g., long-strand fibers).

Figure 15A:
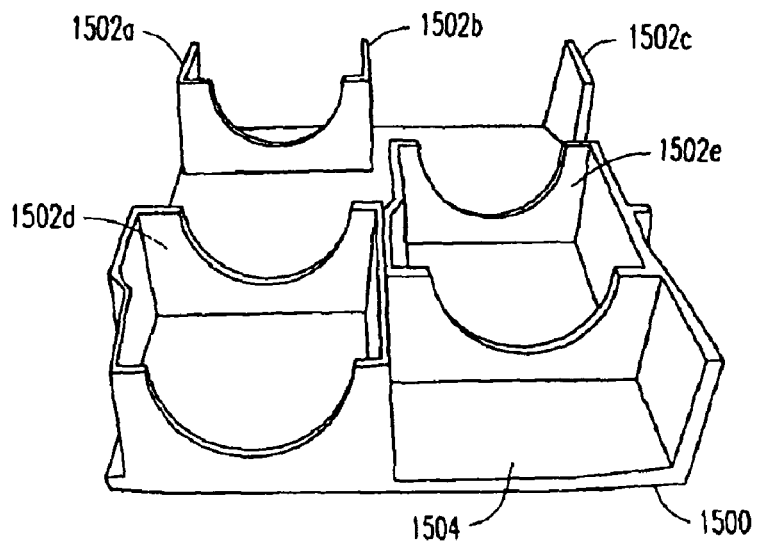
FIGS. 15A and 15B are an exemplary perspective bottom and top views, respectively, of a platform having hidden ribs formed by the extrusion-molding system of FIG. 6A.
Figure 15B:
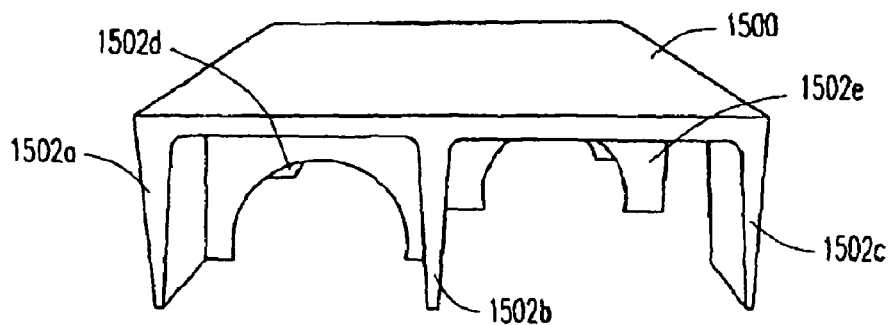

FIGS. 15A and 15B are an exemplary perspective bottom and top views, respectively, of a platform 1500 having hidden ribs 1502a-1502e (collectively 1502). As shown, the hidden ribs 1502 are variable in height, but have a definite volume over one or more zones. Therefore, by depositing more extruded composite material 625 over the zones having the hidden ribs 1502 and less extruded composite material 625 over the zones without the hidden ribs 1502. Because the platform 1500 is formed as a single molded composite structure using the extrusion-molding system 600a, the platform 1500 has fewer weaknesses in the structure compared to a platform that is formed of multiple parts.

Insertion Techniques

Figure 16A:
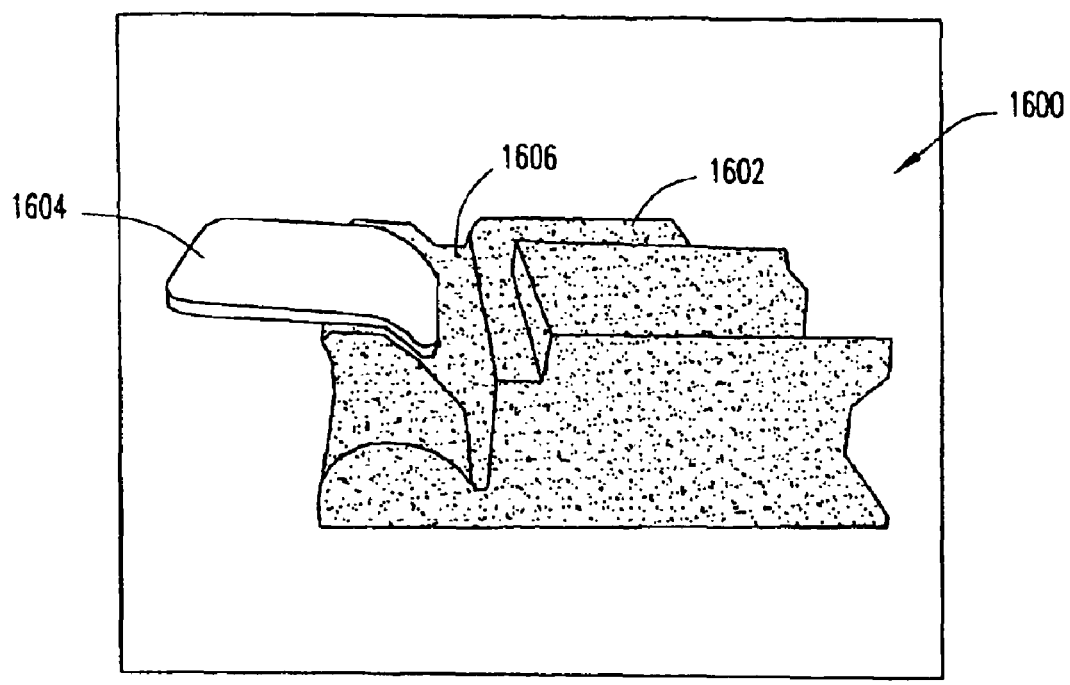
FIGS. 16A and 16B are an exemplary structural parts having inserts formed by the extrusion-molding system of FIG. 6A.

In addition to forming structural parts using composite material having fibers blended therein to provide strength in forming large parts, some structural parts further are structurally improved by having other components, such as attachments, fasteners, and/or stiffeners, inserted or embedded in certain regions. For example, structural parts that are to provide interconnectivity may utilize metallic parts extending from the composite material to provide strong and reliable interconnections. One such structural part is a portion of a floor covering 1600 for an ice rink, as depicted in FIG. 16A. The floor covering 1600 includes the thermoplastic material 1602, which may be formed of the thermoplastic material M1 and fibers M2, and a fastener 1604, which is formed of metal.

In forming the floor covering 1600, the fastener 1604 is positioned or configured in the lower mold 608 so that the extruded composite material layer 628 forms a bond layer 1606 with the fastener 1604 to maintain the position thereof. To further secure the fastener 1604 to the floor covering 1600, holes (not shown) may be included in the fastener 1604 to allow the extruded composite material layer 628 to fill in the holes. During the formation process, actuators may be configured in the lower mold 626 to maintain the position of the fastener 1604 during the extrusion-molding process and released via the controller 612 while the extruded composite material layer 628 is still in molten form. It should be understood that the fastener 1604 alternatively may be configured in the upper mold 632.

Figure 16B:
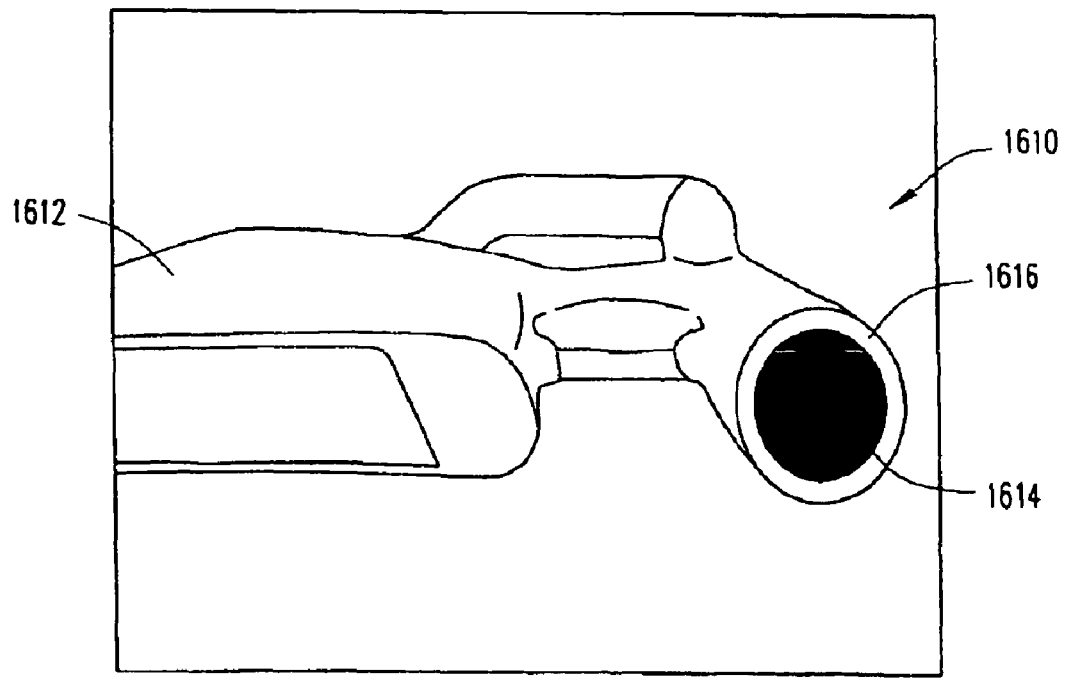

FIG. 16B is an exemplary portion of a backboard 1610 that is often used by paramedics. The backboard 1610 is formed of composite material 1612 and includes an insert 1614 encapsulated in the composite material 1612. The insert 1614 may be a carbon fiber tube so that the backboard 1610 may be stiffened, lightweight, and x-ray transparent. In encapsulating the insert, the lower mold 626 may have actuators or simple pins maintain the insert 1614 in place while the extruded composite material layer 628 forms a bond layer 1616 therewith. Again, while the extruded composite material layer 628 is in a molten state, the actuators and/or pins may be released such that the extruded composite material layer 628 fills in any voids left from the actuators or pins. It should be understood that the insert 1614 may be substantially any material based on the particular application or structural part being formed.

Figure 17:
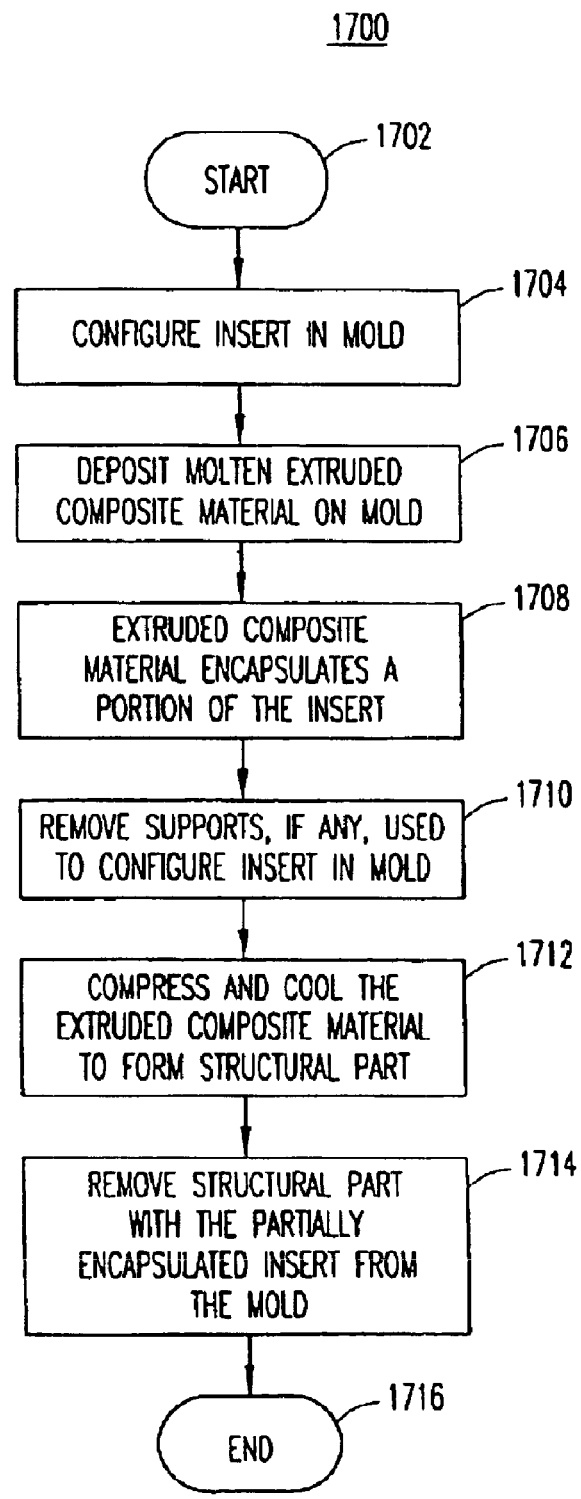
FIG. 17 is an exemplary flow diagram describing the operations for embedding an insert, such as a fastener, support, or other element, into a structural part, such as those shown in FIGS. 16A and 16B, utilizing the extrusion-molding system of FIG. 6A.

FIG. 17 is an exemplary flow diagram 1700 describing the operations for embedding or inserting an insert, such as a fastener, support, or other element, into a structural part utilizing the extrusion-molding system 600a of FIG. 6A. The insertion process starts at step 1702. At step 1704, the insert is configured in either the lower or upper mold 626 or 632. At step 1706, the molten extruded composite material 625 is deposited on the lower mold 626. The extruded composite material is formed about at least a portion of the insert at step 1708 to secure the insert into the structural part being formed. In one embodiment, the insert is encapsulated or completely embedded in the extruded composite material 625 (see, for example, FIG. 16B). Alternatively, only a portion of the insert is embedded in the extruded composite material 625 so that a portion extends from the structural part.

At step 1710, if any supports are used to configure the insert in the lower 626 or upper 632 mold, then the supports are removed. The supports, which may be actuator controlled, simple mechanical pins, or other mechanism capable of supporting the insert during deposition of the extruded composite material 625 onto the lower mold 626, are removed before the extruded composite material layer 628 is hardened at step 1712. The extruded composite material layer 628 may be hardened by natural or forced cooling during pressing, vacuuming, or other operation to form the structural part. By removing the supports prior to the extruded composite material layer 628 being hardened, gaps produced by the supports may be filled in, thereby leaving no trace of the supports or weak spots in the structural part. At step 1714, the structural part with the insert at least partially embedded therein is removed from the mold 626 and 632. The insertion process ends at step 1716.

In another embodiment of the invention, an insert is encapsulated by a process of the claimed invention. In a manner analogous to the process described in FIG. 17, an insert, such as a fastener, support, or other element, may be encapsulated with extruded thermoplastic material utilizing the claimed extrusion-molding system. In other embodiments of the invention, multiple layers of material of varying thickness may be deposited one on top of the other utilizing the claimed extrusion-molding system. Specifically, a first layer of thermoplastic material is extruded into a lower mold, following which a second layer of the same or different thermoplastic material is layered on top of the first layer. In certain embodiments of the invention, an insert may be placed on top of the first extruded layer prior to or instead of layering the first layer with a second extruded layer. This form of "layering" can facilitate the formation of a structure having multiple layers of thermoplastic material, of the same or different composition, and layers of different inserted materials.

The foregoing description is of a preferred embodiment for implementing the invention, and the scope of the invention should not be limited by this description. The scope of the present invention is instead defined by the following claims.

What is claimed is:

1. A method for forming a solid article from a viscous material and fiber, said method comprising:
    blending the viscous material with the fiber to form a composite material;
    extruding the composite material and depositing gravitationally said composite material onto a lower mold portion;
    moving at least a portion of the lower mold portion during gravitational depositing of the composite material, so as to deposit a quantity of composite material on said lower mold portion conforming to mold cavities of the lower mold portion;
    compressing an upper mold portion against said quantity of composite material, after said quantity of composite material has been gravitationally deposited onto said lower mold portion; and
    maintaining the quantity of composite material under such conditions that the quantity of composite material hardens within a mold cavity formed between the upper mold portion and the lower mold portion, so as to form said solid article.

2. The method of claim 1, further comprising controlling flow of composite material to vary the quantity of composite material being gravitationally deposited onto the lower mold portion over time.

3. The method of claim 1, wherein the fiber blended with the viscous material is between approximately one-half and approximately four inches in length.

4. The method of claim 1, wherein the fiber has an average fiber length of at least one inch.

5. The method of claim 1, wherein said composite material comprises a concentration of fiber of approximately at least ten percent by weight.

6. The method of claim 1, wherein the composite material comprises a concentration of fiber of at least 40 percent by weight.

7. The method of claim 1, wherein moving of the lower mold portion, results in formation of a predetermined quantity of composite material of varying thickness on said lower mold portion.

8. The method of claim 1, wherein moving of the lower mold portion is along a single axis.

9. The method of claim 1, wherein extruding said composite material produces composite material having a minimum of approximately 85 percent of unbroken fibers.

10. The method of claim 1, further comprising the step of controlling said extruding to vary a volumetric flow rate and a relative position of an extrusion die and the lower mold portion.

11. The method of claim 1, wherein the composite material is extruded onto an insert contained within the lower mold portion.

12. The method of claim 11, wherein the insert is at least partially embedded within the composite material.

13. The method of claim 1, wherein, extruding comprises extruding at least one first layer and at least one second layer onto the lower mold portion.

14. The method of claim 1, wherein said viscous material comprises a thermoplastic resin.

15. The method of claim 1, wherein said viscous material comprises a thermoset resin.

16. The method of claim 1, wherein said maintaining step comprises causing a chemical reaction within the mold cavity.

17. The method of claim 1, wherein the viscous material comprises at least one polymer selected from the group consisting of: polyethylene; polysulfone; polypropylene oxide; polyvinyl chloride; polybutylene terephthalate; polyvinylidene chloride; polyethylene terephthalate; polystyrene; polycyclohexane diethylene; terephthalate; styrene-butadiene-acrylonitrile; polybutylene naphthalate copolymer; nylon 6; nylon 66; nylon 11; nylon 12; thermotropic liquid crystal polymers; polyphenylene sulfide; polyether ether ketones; polyether sulfones; copolymers of aliphatic nylons polyether imides further copolymerized with terephthalic acid or other aromatic dicarboxylic acids or aromatic diamines; polyamide imides; copolymerized polyamides polyimides; polycarbonate; polyurethane; polyacetal; polyether amides; polymethylmethacrylate; and polyester amides.

18. The method of claim 1, wherein extruding comprises dynamically outputting the composite material at different volumetric flow rates across a plane; and
    positionally synchronizing said lower mold portion to receive the composite material in relation to the different volumetric flow rates across the plane.

19. The method of claim 1 wherein said lower mold portion resides on a trolley, and said upper mold portion resides within a press, said method further comprising,
    transporting said lower mold portion on said trolley into said press, after depositing gravitationally said composite material onto said lower mold portion, and
    compressing, within said press, said upper mold portion against said quantity of composite material, after said quantity of composite material has been gravitationally deposited onto said lower mold portion.

* * * * *